(12) United States Patent
Kuroda et al.

(10) Patent No.: US 8,576,538 B2
(45) Date of Patent: Nov. 5, 2013

(54) ELECTRONIC COMPONENT AND SUBSTRATE MODULE

(75) Inventors: Yoichi Kuroda, Nagaokakyo (JP); Yoshio Kawaguchi, Nagaokakyo (JP)

(73) Assignee: Murata Manuacturing Co., Ltd., Kyoto (JP)

( * ) Notice: Subject to any disclaimer, the term of this patent is extended or adjusted under 35 U.S.C. 154(b) by 58 days.

(21) Appl. No.: 13/359,520

(22) Filed: Jan. 27, 2012

(65) Prior Publication Data

US 2012/0194963 A1 Aug. 2, 2012

(30) Foreign Application Priority Data

Jan. 28, 2011 (JP) ................................. 2011-016824

(51) Int. Cl.
*H01G 4/30* (2006.01)

(52) U.S. Cl.
USPC ............... 361/301.4; 361/303; 361/306.1; 361/306.3; 361/321.2; 361/308.1

(58) Field of Classification Search
USPC ............... 361/301.4, 303–305, 301.2, 308.1, 361/306.1, 306.3, 321.1–321.2, 311–313
See application file for complete search history.

(56) References Cited

U.S. PATENT DOCUMENTS

| | | | |
|---|---|---|---|
| 6,191,932 B1 * | 2/2001 | Kuroda et al. | 361/303 |
| 6,331,930 B1 * | 12/2001 | Kuroda et al. | 361/306.3 |
| 6,519,134 B1 * | 2/2003 | Li et al. | 361/306.1 |
| 7,046,500 B2 * | 5/2006 | Lee et al. | 361/303 |
| 7,339,781 B2 * | 3/2008 | Yoshii et al. | 361/309 |
| 7,411,776 B2 * | 8/2008 | Aoki | 361/306.3 |
| 7,558,049 B1 * | 7/2009 | Togashi et al. | 361/306.3 |
| 7,710,710 B2 * | 5/2010 | Brunner et al. | 361/306.3 |
| 7,995,325 B2 * | 8/2011 | Togashi | 361/303 |
| 8,014,125 B2 * | 9/2011 | Drapkin et al. | 361/311 |
| 8,085,524 B2 * | 12/2011 | Roozeboom et al. | 361/306.2 |
| 8,194,389 B2 * | 6/2012 | Lee et al. | 361/303 |
| 2009/0109596 A1 | 4/2009 | Togashi | |
| 2010/0157506 A1 | 6/2010 | Togashi | |

FOREIGN PATENT DOCUMENTS

| | | | |
|---|---|---|---|
| JP | 11-312622 | A | 11/1999 |
| JP | 2000-106320 | A | 4/2000 |
| JP | 2000-306762 | A | 11/2000 |
| JP | 2001-185440 | A | 7/2001 |
| JP | 2004-140183 | A | 5/2004 |
| JP | 2004-319597 | A | 11/2004 |
| JP | 2009-111281 | A | 5/2009 |
| JP | 2010-147429 | A | 7/2010 |
| JP | 2011-018758 | A | 1/2011 |
| JP | 2011-100834 | A | 5/2011 |

OTHER PUBLICATIONS

Kuroda et al., "Electronic Component and Substrate Module", U.S. Appl. No. 13/359,524, filed Jan. 27, 2012.
Official Communication issued in corresponding Japanese Patent Application No. 2011-016824, mailed on Feb. 26, 2013.

* cited by examiner

*Primary Examiner* — Nguyen T Ha

(74) *Attorney, Agent, or Firm* — Keating & Bennett, LLP

(57) ABSTRACT

A multilayered body includes capacitor conductors and an internal conductor, which together define a capacitor. A first external electrode is connected to one of the capacitor conductors via a set of lead electrodes. A second external electrode is connected to the other capacitor conductor via another set of lead electrodes. The internal conductor faces the capacitor conductors.

10 Claims, 25 Drawing Sheets

ELECTRONIC COMPONENT AND SUBSTRATE MODULE

BACKGROUND OF THE INVENTION

1. Field of the Invention

The present invention relates to an electronic component and a substrate module, and more particularly to an electronic component and a substrate module, which include a built-in capacitor.

2. Description of the Related Art

As a related electronic component, for example, a multilayer ceramic capacitor disclosed in Japanese Unexamined Patent Application Publication No. 2000-306762 is known. FIG. 25 is a cross-sectional structure diagram of a multilayer ceramic capacitor 500 disclosed therein.

The multilayer ceramic capacitor 500 includes dielectric layers 502, internal electrode layers 504a, 504b and terminal electrodes 506a, 506b.

The dielectric layers 502 are stacked and form a multilayered body. The internal electrode layers 504a and 504b are included inside the multilayered body, and form a capacitor by facing each other over the dielectric layer 502. The internal electrode layers 504a and 504b are each led out to an opposite end surface of the multilayered body. The terminal electrodes 506a and 506b are each provided on the opposite end surface of the multilayered body, and connect to the internal electrode layers 504a and 504b, respectively.

With regard to the multilayer ceramic capacitor 500, there is a need to reduce the insertion loss in high frequency bands.

SUMMARY OF THE INVENTION

Preferred embodiments of the present invention provide an electronic component and a substrate module, which are significantly reduce insertion loss in high frequency bands.

According to a preferred embodiment of the present invention, an electronic component includes a multilayered body having a substantially rectangular solid shape and including a plurality of dielectric layers stacked on each other; a plurality of first capacitor conductors each being provided on a different one of the dielectric layers; a plurality of first lead conductors each connected to the first capacitor conductor and being led out to a first end surface of the multilayered body; a plurality of third lead conductors each connected to the first capacitor conductor and being led out to a first side surface of the multilayered body, the third lead conductor not touching the first lead conductor; a plurality of second capacitor conductors each being provided on a different one of the dielectric layers; a plurality of second lead conductors each connected to the second capacitor conductor and being led out to a second end surface of the multilayered body; a plurality of fourth lead conductors each connected to the second capacitor conductor and being led out to the first side surface, the fourth lead conductor not touching the second lead conductor; a third capacitor conductor provided on the dielectric layer, the third capacitor conductor facing the first capacitor conductor and the second capacitor conductor over the dielectric layer; a first external electrode arranged so as to straddle the first end surface, the first side surface and a bottom surface of the multilayered body, the first external electrode connected to the plurality of first lead conductors and the plurality of third lead conductors; and a second external electrode arranged so as to straddle the second end surface, the first side surface and the bottom surface, the second external electrode connected to the plurality of second lead conductors and the plurality of fourth lead conductors.

According to another preferred embodiment of the present invention, an electronic component includes a multilayered body having a substantially rectangular solid shape and including a plurality of dielectric layers stacked on each other; a plurality of first capacitor conductors each being provided on a different one of the dielectric layers; a plurality of first lead conductors each connected to the first capacitor conductor and being led out to a first end surface of the multilayered body; a plurality of third lead conductors each connected to the first capacitor conductor and being led out to a first side surface of the multilayered body, the third lead conductor not touching the first lead conductor; a plurality of second capacitor conductors each being provided on a different one of the dielectric layers and facing one of the first capacitor conductors over the dielectric layer; a plurality of second lead conductors each connected to the second capacitor conductor and being led out to a second end surface of the multilayered body; a plurality of fourth lead conductors each connected to the second capacitor conductor and being led out to the first side surface, the fourth lead conductor not touching the second lead conductor; a first external electrode arranged so as to straddle the first end surface, the first side surface and a bottom surface of the multilayered body, the first external electrode connected to the plurality of first lead conductors and the plurality of third lead conductors; and a second external electrode arranged so as to straddle the second end surface, the first side surface and the bottom surface, the second external electrode connected to the plurality of second lead conductors and the plurality of fourth lead conductors.

According to still another preferred embodiment of the present invention, a substrate module includes a circuit substrate including a first land and a second land; and an electronic component according to a preferred embodiment of the present invention described above mounted on the circuit substrate; wherein the first external electrode is connected to the first land; and the second external electrode is connected to the second land.

According to various preferred embodiments of the present invention, the insertion loss in the high frequency bands is significantly reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of an electronic component and a substrate module according to the present invention will be described below with reference to drawings.

First Preferred Embodiment

Figure 1:
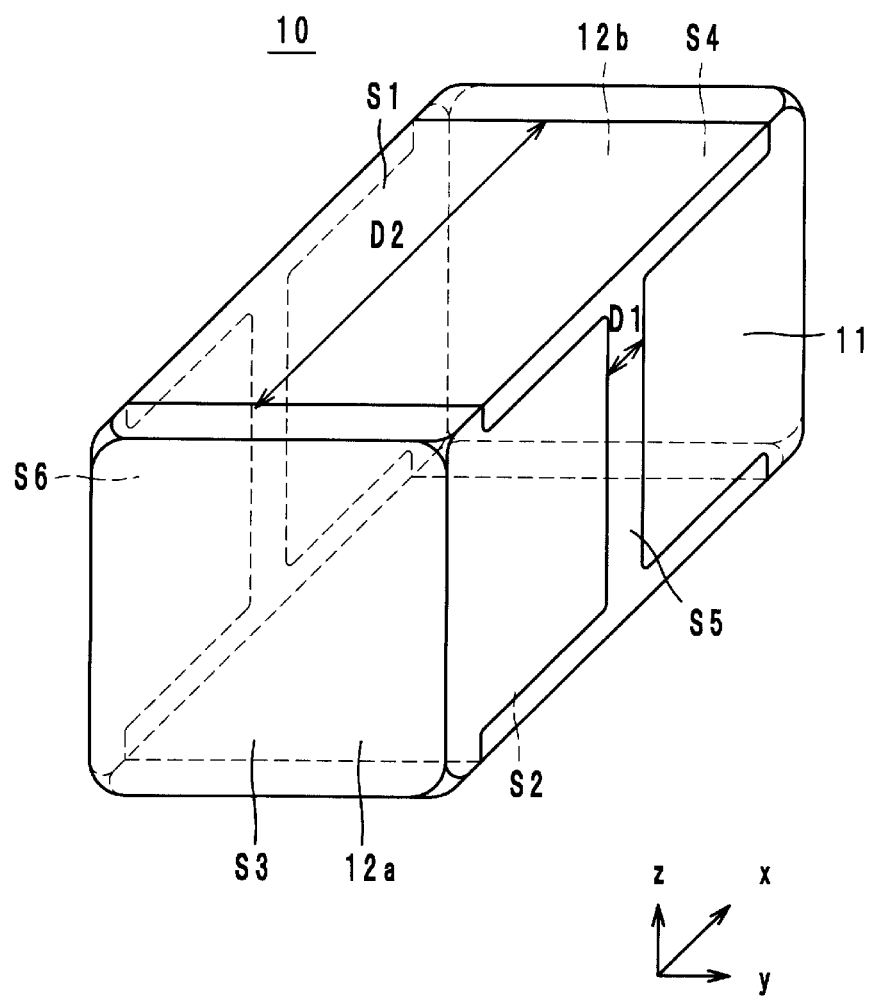
FIG. 1 is an external perspective view of an electronic component according to a first preferred embodiment of the present invention.
Figure 2:
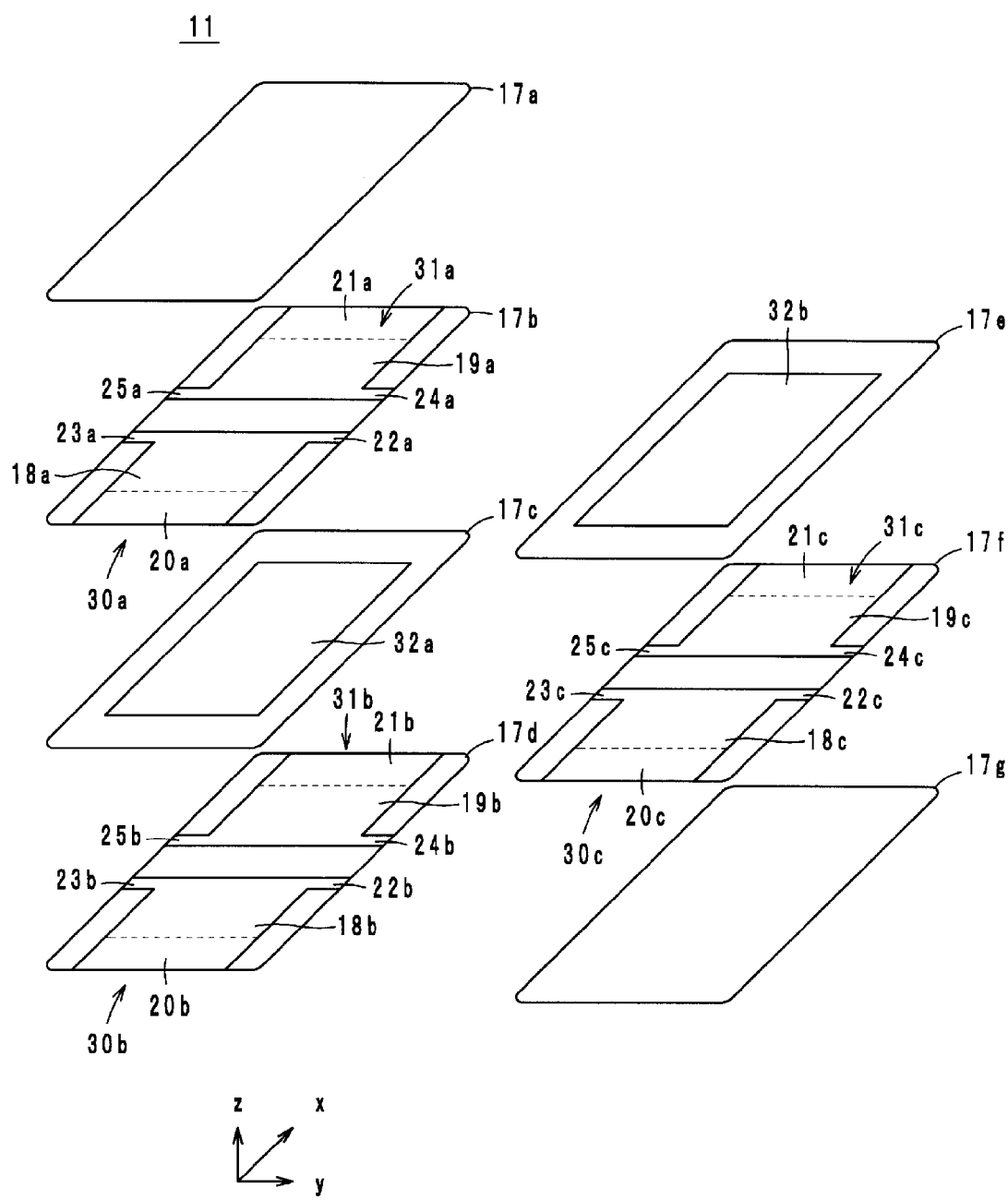
FIG. 2 is an exploded perspective view of a multilayered body of the electronic component illustrated in FIG. 1.
Figure 3A:
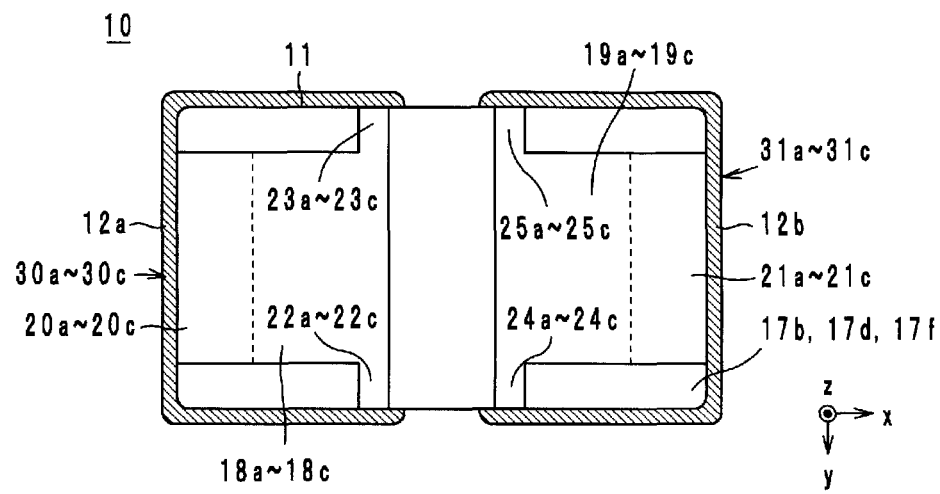
FIG. 3A and FIG. 3B are internal plane views of the electronic component illustrated in FIG. 1.
Figure 3B:
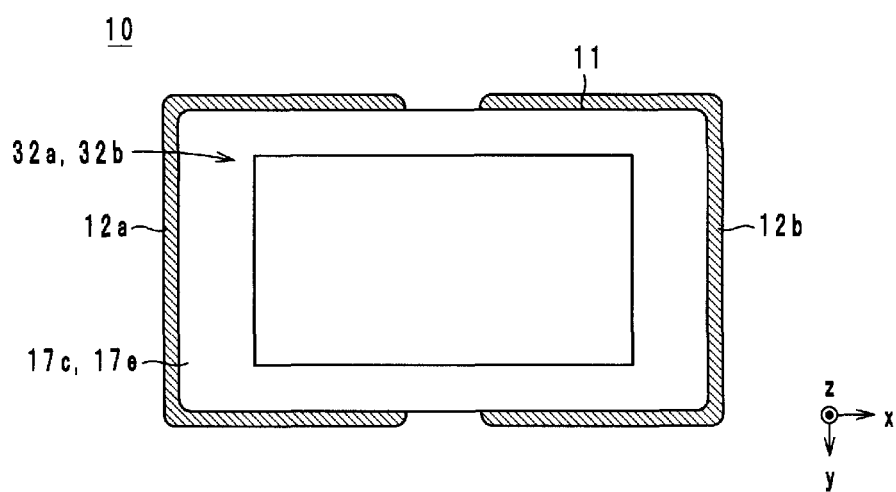

A structure of an electronic component according to the first preferred embodiment will be described with reference to drawings. FIG. 1 is an external perspective view of the electronic component 10 according to the first preferred embodiment. FIG. 2 is an exploded perspective view of a multilayered body 11 of the electronic component 10 illustrated in FIG. 1. FIG. 3A and FIG. 3B are internal plane views of the electronic component 10 illustrated in FIG. 1. Below, a stacking direction in the multilayered body 11 is defined as a Z-axis. An x-direction is defined as a direction in which a longer side of the multilayered body 11 extends in a plane view when the multilayered body 11 is viewed along the Z-axis direction. A y-direction is defined as a direction in which a shorter side of the multilayered body 11 extends in a plane view when the multilayered body 11 is viewed along the Z-axis direction.

The electronic component 10 is, for example, a chip capacitor and includes, for example as illustrated in FIG. 1 to FIG. 3A and FIG. 3B, the multilayered body 11, external electrodes 12 (12a, 12b) and internal conductors 30 (30a-30c), 31 (31a-31c), 32 (32a, 32b) (not shown in FIG. 1).

The multilayered body 11 preferably has a substantially rectangular solid shape except corners and ridges that are chamfered and define roundish shapes, for example. Below, in the multilayered body 11, a surface at the positive side of the z-axis direction is defined as an upper surface S1, and a surface at the negative side of the z-axis direction is defined as a lower surface S2. Furthermore, a surface at the negative side of the x-axis direction is defined as an end surface S3, and a surface at the positive side of the x-axis direction is defined as an end surface S4. Furthermore, a surface at the positive side of the y-axis direction is defined as a side surface S5, and a surface at the negative side of the y-axis direction is defined as a side surface S6.

As illustrated in FIG. 2, the multilayered body 11 is constructed in such a way that a plurality of ceramic layers 17 (17a-17g) are stacked in order of appearance from the positive side to the negative side of the z-axis direction. The ceramic layer 17 preferably has a substantially rectangular shape and is made of dielectric ceramic. Below, a principle surface of the ceramic layer 17 at the positive side of the z-axis direction is referred to as a top surface, and a principle surface of the ceramic layer 17 at the negative side of the z-axis direction is referred to as a back surface.

The upper surface S1 of the multilayered body 11 is constructed of the top surface of the ceramic layer 17 arranged at the most positive side of the z-axis direction. The lower surface S2 of the multilayered body 11 is constructed of the back surface of the ceramic layer 17 arranged at the most negative side of the z-axis direction. Furthermore, the end surface S3 is constructed of stacked shorter sides of the ceramic layers 17a-17g at the most negative side of the x-axis direction. The end surface S4 is constructed of stacked shorter sides of the ceramic layers 17a-17g at the most positive side of the x-axis direction. The side surface S5 is constructed of stacked longer sides of the ceramic layers 17a-17g at the most positive side of the y-axis direction. The side surface S6 is constructed of stacked longer sides of the ceramic layers 17a-17g at the most negative side of the y-axis direction.

As illustrated in FIG. 2 and FIG. 3A, the plural internal conductors 30a-30c, 31a-31c are provided on the top surfaces of the different ceramic layers 17b, 17d, 17f, respectively, and embedded inside the multilayered body 11. Furthermore, as illustrated in FIG. 2 and FIG. 3B, the internal conductors 32a and 32b are provided on the top surfaces of the ceramic layers 17c and 17e, respectively, and embedded inside the multilayered body 11. In other words, the internal conductors 30, 31 and the internal conductors 32 are stacked alternately in the z-axis direction.

The internal conductor 30 (30a-30c) includes a capacitor conductor 18 (18a-18c) and lead conductors 20 (20a-20c), (22a-22c) and 23 (23a-23c). The capacitor conductors 18a-18c have substantially rectangular shapes, and are arranged on the top surfaces of different ceramic layers 17b, 17d, 17f, respectively, such that they do not touch external edges of the corresponding ceramic layers 17b, 17d, 17f. The capacitor conductor 18 is provided within an area of the ceramic layer 17, which is about one-half of the whole area of the ceramic layer 17 at the negative side of the x-axis direction.

The lead conductors 20a-20c are connected to the capacitor conductors 18a-18c, respectively, and led to the end surface S3 of the multilayered body 11 to be exposed at the end surface S3. More specifically, the lead conductor 20 protrudes toward the negative side of the x-axis direction from the longer side of the capacitor conductor 18 at the negative side of the x-axis direction. Accordingly, the lead conductor 20 is led out to the shorter side of the ceramic layer 17 at the negative side of the x-axis direction. The width of the lead conductor 20 in the y-axis direction is substantially the same as the width of the capacitor conductor 18 in the y-axis direction.

The lead conductors 22a-22c are connected to the capacitor conductors 18a-18c, respectively, and are led to the side surface S5 of the multilayered body 11 to be exposed at the side surface S5. More specifically, the lead conductor 22 extends toward the positive side of the y-axis direction from an end at the positive side of the x-axis direction of the shorter side of the capacitor conductor 18 at the positive side of the y-axis direction. Accordingly, the lead conductor 22 is led out to a position at a further negative side of the x-axis direction than a middle point of the longer side of the ceramic layer 17 at the positive side of the y-axis direction. The lead conductor 22 does not touch the lead conductor 20.

The lead conductors 23a-23c are connected to the corresponding capacitor conductors 18a-18c, respectively, and led to the side surface S6 of the multilayered body 11 to be exposed at the side surface S6. More specifically, the lead conductor 23 extends toward the negative side of the y-axis direction from an end at the positive side of the x-axis direction of the shorter side of the capacitor conductor 18 at the negative side of the y-axis direction. Accordingly, the lead conductor 23 is led out to a position at a further negative side of the x-axis direction than a middle point of the longer side of the ceramic layer 17 at the negative side of the y-axis direction. The lead conductor 23 does not touch the lead conductor 20.

The internal conductor 31 (31a-31c) includes a capacitor conductor 19 (19a-19c) and lead conductors 21 (21a-21c), (24a-24c) and 25 (25a-25c). The capacitor conductors 19a-19c have substantially rectangular shapes, and are arranged on the top surfaces of different ceramic layers 17b, 17d and 17f such that they do not touch external edges of the corresponding ceramic layers 17b, 17d and 17f. The capacitor conductor 19 is provided within an area of the ceramic layer 17, which is one-half of the whole area of the ceramic layer 17 at the positive side of the x-axis direction. The capacitor conductors 18 and 19 are provided on the same top surface of the ceramic layer 17, and face each other.

The lead conductors 21a-21c are connected to the corresponding capacitor conductors 19a-19c, respectively, and led to the end surface S4 of the multilayered body 11 to be exposed at the end surface S4. More specifically, the lead conductor 21 protrudes toward the positive side of the x-axis direction from the longer side of the capacitor conductor 19 at the positive side of the x-axis direction. Accordingly, the lead conductor 21 is led out to the shorter side of the ceramic layer 17 at the positive side of the x-axis direction. The width of the lead conductor 21 in the y-axis direction is substantially the same as the width of the capacitor conductor 19 in the y-axis direction.

The lead conductors 24a-24c are connected to the capacitor conductors 19a-19c, respectively, and led to the side surface S5 of the multilayered body 11 to be exposed at the side surface S5. More specifically, the lead conductor 24 extends toward the positive side of the y-axis direction from an end at the negative side of the x-axis direction in the shorter side of the capacitor conductor 19 at the positive side of the y-axis direction. Accordingly, the lead conductor 24 is led out to a position at a further positive side of the x-axis direction than the middle point of the longer side of the ceramic layer 17 at the positive side of the y-axis direction. In other words, the lead conductor 24 is disposed at a further positive side of the x-axis direction than the lead conductor 22 in a plane viewed in the z-axis direction. The lead conductor 24 does not touch the lead conductor 21.

The lead conductors 25a-25c are connected to the capacitor conductors 19a-19c, respectively, and led to the side surface S6 of the multilayered body 11 to be exposed at the side surface S6. More specifically, the lead conductor 25 extends toward the negative side of the y-axis direction from an end at the negative side of the x-axis direction of the shorter side of the capacitor conductor 19 at the negative side of the y-axis direction. Accordingly, the lead conductor 25 is led out to a position at a further positive side of the x-axis direction than a middle point of the longer side of the ceramic layer 17 at the negative side of the y-axis direction. In other words, the lead conductor 25 is disposed at a further positive side of the x-axis direction than the lead conductor 23 in a plane viewed in the z-axis direction. The lead conductor 25 does not touch the lead conductor 21.

The internal conductors 32a and 32b have substantially rectangular shapes, and are arranged on the top surfaces of the ceramic layers 17c and 17e, respectively, such that they do not touch external edges of the corresponding ceramic layers 17c and 17e. The internal conductor 32 is provided on the top surface of the ceramic layer 17 that is different from the ceramic layer 17 in which the capacitor conductors 18 and 19 are provided, and faces the capacitor conductors 18 and 19 over the ceramic layer 17. As a result, capacitors are defined between the capacitor conductor 18 and the internal conductor 32 and between the capacitor conductor 19 and the internal conductor 32. The capacitor located between the capacitor conductor 18 and the internal conductor 32 is connected in series to the capacitor formed between the capacitor conductor 19 and the internal conductor 32.

The external electrode 12a is arranged so as to straddle the end surface S3, the upper surface S1, the lower surface S2 and the side surfaces S5, S6, and to connect with all the lead conductors 20a-20c, 22a-22c and 23a-23c. More specifically, the external electrode 12a covers the whole area of the end surface S3 of the multilayered body 11 so as to cover portions of the lead conductors 20a-20c exposed from the end surface S3. Furthermore, the external electrode 12a is folded down from the end surface S3 to the upper surface S1, the lower surface S2 and the side surfaces S5, S6. The external electrode 12a covers the side surfaces S5 and S6 of the multilayered body 11 so as to cover portions of the lead conductors 22a-22c, 23a-23c exposed from the side surfaces S5 and S6.

The external electrode 12b is arranged so as to straddle the end surface S4, the upper surface S1, the lower surface S2 and the side surfaces S5, S6, and to connect with all the lead conductors 21a-21c, 24a-24c and 25a-25c. More specifically, the external electrode 12b covers the whole area of the end surface S4 of the multilayered body 11 so as to cover portions of the lead conductors 21a-21c exposed from the end surface S4. Furthermore, the external electrode 12b is folded down from the end surface S4 to the upper surface S1, the lower surface S2 and the side surfaces S5, S6. The external electrode 12b covers the side surfaces S5 and S6 of the multilayered body 11 so as to cover portions of the lead conductors 24a-24c, 25a-25c exposed from the side surfaces S5 and S6.

Note that, as illustrated in FIG. 1, the widths of the external electrode 12a along the x-axis direction in the side surfaces S5 and S6 are wider than the widths of the external electrode 12a along the x-axis direction in the upper surface S1 and the lower surface S2. Similarly, the widths of the external electrode 12b along the x-axis direction in the side surfaces S5 and S6 are wider than the widths of the external electrode 12b along the x-axis direction in the upper surface S1 and the lower surface S2. According to the above, gaps D1 between the external electrode 12a and the external electrode 12b in the side surfaces S5 and S6 are smaller than a gap D2 between the external electrode 12a and the external electrode 12b in the bottom surface S2.

Furthermore, in the side surface S5 and S6, no external electrode that retains a different electrical potential from those of the external electrodes 12a and 12b is provided in between the external electrode 12a and the external electrode 12b. In other words, there is no external electrode provided between the external electrodes 12a and 12b.

A non-limiting example of a method for manufacturing the electronic component 10 is described. As the drawings, FIG. 1, FIG. 2, FIG. 3A and FIG. 3B are used.

First, $BaTiO_3$, $CaTiO_3$, $SrTiO_3$ or $CaZrO_3$, which is used as a primary component, and a Mn compound, a Mg compound, a Si compound, a Co compound, a Ni compound or a rare earth compound, which is used as an accessory component, are weighed at a predetermined ratio and are then put in a ball mill, and wet mixing is performed. An obtained mixture is dried and pulverized. Then, an obtained powder is calcined. After a calcined powder is wet-pulverized by a ball mill, drying and pulverizing are performed to obtain a dielectric ceramic powder.

To this dielectric ceramic powder, an organic binder and an organic solvent are added, and mixing is then performed using a ball mill. An obtained ceramic slurry is formed into sheets on a carrier sheet by a doctor blade method. The sheets are then dried to form ceramic green sheets that are to be used as the ceramic layers 17. The thickness of the ceramic layer 17 after the firing is preferably about 0.5 µm to about 10 µm, for example.

Next, the internal conductors 30-32 are formed on the ceramic green sheets, which are to be formed into the ceramic layers 17, by applying a paste including a conductive material using a method such as a screen printing or a photolithographic method. As the paste including a conductive material, for example, a paste formed by adding an organic binder and an organic solvent to a metal powder may preferably be used. The metal powder may be, for example, Ni, Cu, Ag, Pd, Ag—Pd alloy, Au or the like. The thicknesses of the internal conductors 30-32 after the firing are preferably about 0.3 µm to about 2.0 µm, for example.

The ceramic green sheets that are to be formed into the ceramic layers 17 are stacked to obtain a non-fired mother multilayered body. Subsequently, pressure bonding is performed on the non-fired mother multilayered body by using a hydrostatic pressure press.

The non-fired mother multilayered body is cut to predetermined sizes to obtain a plurality of non-fired multilayered bodies 11. Subsequently, a barrel polishing process is performed on the surfaces of the multilayered body 11.

The non-fired multilayered body 11 is fired. As the firing temperature, for example, a temperature of about 900° C. to about 1,300° C., for example, is preferable. With the foregoing steps, the preparation of the multilayered body 11 is completed.

Next, the external electrode 12 is formed on the multilayered body 11. More specifically, an electrically conductive paste is applied on the surfaces of the multilayered body 11 by using a well-known dip method, a slit method or the like. The electrically conductive paste is then baked at a temperature of about 700° C. to about 900° C., for example, to produce an underlayer electrode of the external electrode 12. As a material for the electrically conductive paste, Cu, Ni, Ag, Pd, Ag—Pd alloy, Au or the like may be used, for example. The thickness of the underlayer electrode is preferably about 10 µm to about 50 µm, for example. Next, plating is performed on the underlayer electrode to complete the external electrode 12. As a material for the plating, Cu, Ni, Ag, Pd, Ag—Pd alloy, Au or the like may be used, for example. The plating may be repeated plural times to form layers of the plating on the underlayer electrode. With the foregoing steps, the electronic component 10 is completed.

A method for manufacturing the electronic component 10 is described. As the drawings, FIG. 1, FIG. 2, FIG. 3A and FIG. 3B are used.

First, $BaTiO_3$, $CaTiO_3$, $SrTiO_3$ or $CaZrO_3$, which is used as a primary component, and a Mn compound, a Mg compound, a Si compound, a Co compound, a Ni compound or a rare earth compound, which is used as an accessory component, are weighed at a predetermined ratio and are then put in a ball mill, and wet mixing is performed. An obtained mixture is dried and pulverized. Then, an obtained powder is calcined. After a calcined powder is wet-pulverized by a ball mill, drying and pulverizing are performed to obtain a dielectric ceramic powder.

To this dielectric ceramic powder, an organic binder and an organic solvent are added, and mixing is then performed using a ball mill. An obtained ceramic slurry is formed into sheets on a carrier sheet by a doctor blade method. The sheets are then dried to form ceramic green sheets that are to be used as the ceramic layers 17. The thickness of the ceramic layer 17 after the firing is preferably about 0.5 µm to about 10 µm, for example.

Next, the internal conductors 30-32 are formed on the ceramic green sheets which are to be formed into the ceramic layers 17 by applying a paste including a conductive material using a method such as a screen printing or a photolithographic method. As the paste including a conductive material, for example, a paste formed by adding an organic binder and an organic solvent to a metal powder may preferably be used. The metal powder may be, for example, Ni, Cu, Ag, Pd, Ag—Pd alloy, Au or other suitable material. The thicknesses of the internal conductors 30-32 after the firing are preferably about 0.3 µm to about 2.0 µm, for example.

The ceramic green sheets that are to be formed into the ceramic layers 17 are stacked to obtain a non-fired mother multilayered body. Subsequently, pressure bonding is performed on the non-fired mother multilayered body by using a hydrostatic pressure press.

The non-fired mother multilayered body is cut to predetermined sizes to obtain a plurality of non-fired multilayered bodies 11. Subsequently, a barrel polishing process is performed on the surfaces of the multilayered body 11.

The non-fired multilayered body 11 is fired. As the firing temperature, for example, a temperature of about 900° C. to about 1,300° C., for example, is preferable. With the foregoing steps, the preparation of the multilayered body 11 is completed.

Next, the external electrode 12 is formed on the multilayered body 11. More specifically, an electrically conductive paste is applied on the surfaces of the multilayered body 11 by using a well-known dip method, a slit method or the like. The electrically conductive paste is then baked at a temperature of about 700° C. to about 900° C., for example, to produce an underlayer electrode of the external electrode 12. As a material for the electrically conductive paste, Cu, Ni, Ag, Pd, Ag—Pd alloy, Au or the like may be used, for example. The thickness of the underlayer electrode is preferably about 10 μm to about 50 μm, for example. Next, plating is performed on the underlayer electrode to complete the external electrode 12. As a material for the plating, Cu, Ni, Ag, Pd, Ag—Pd alloy, Au or the like may be used, for example. The plating may be repeated plural times to form layers of the plating on the underlayer electrode. With the foregoing steps, the electronic component 10 is completed.

Figure 4A:
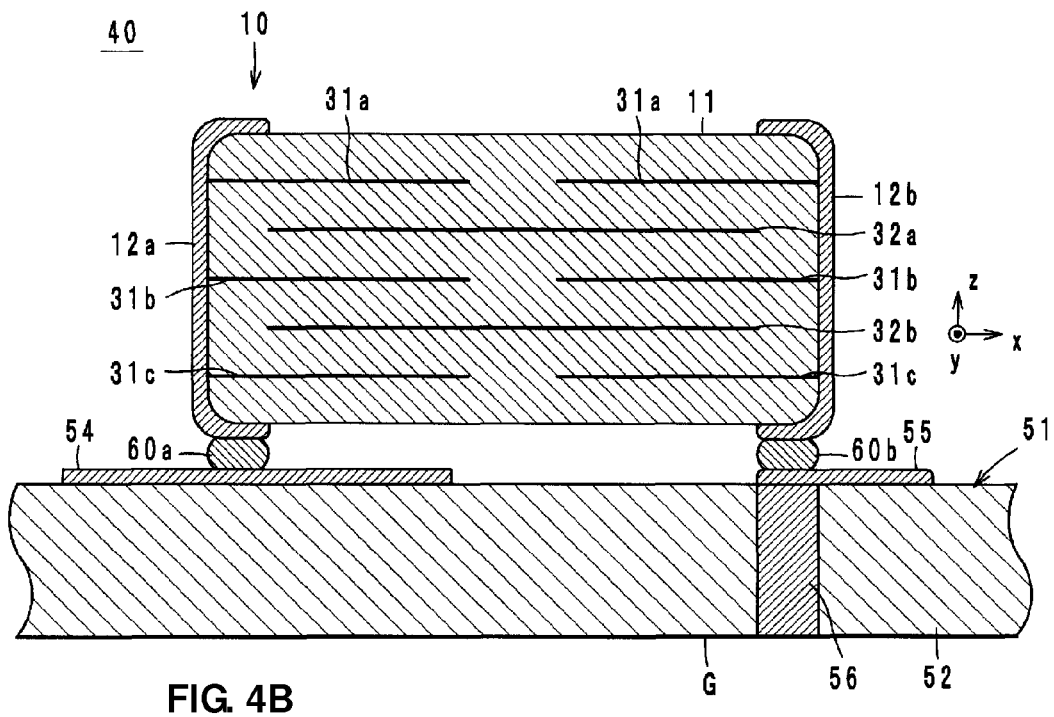
FIG. 4A is a cross-sectional structure diagram of a substrate module.
Figure 4B:
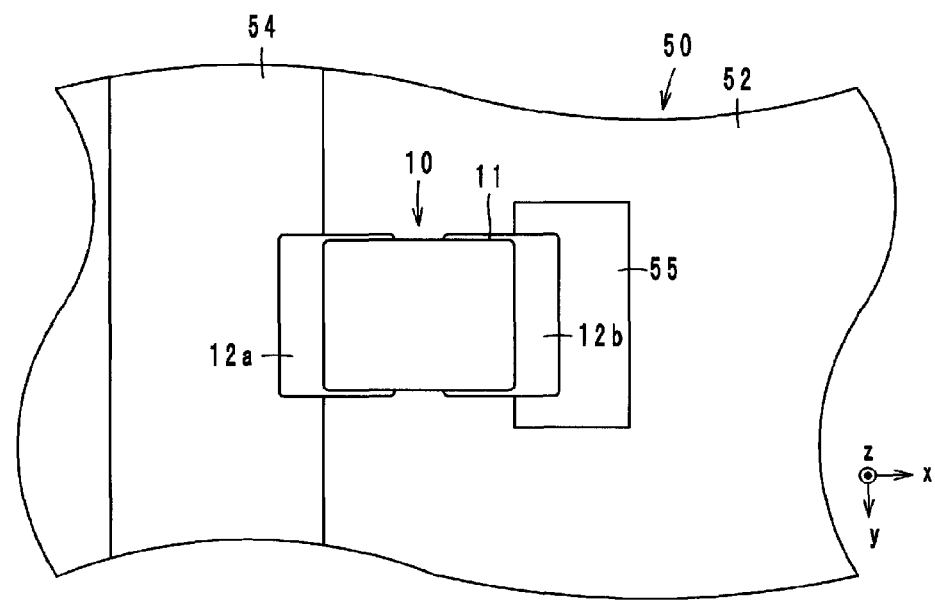
FIG. 4B is a plane view of the substrate module viewed from the positive side of a Z-axis direction.
Figure 5:
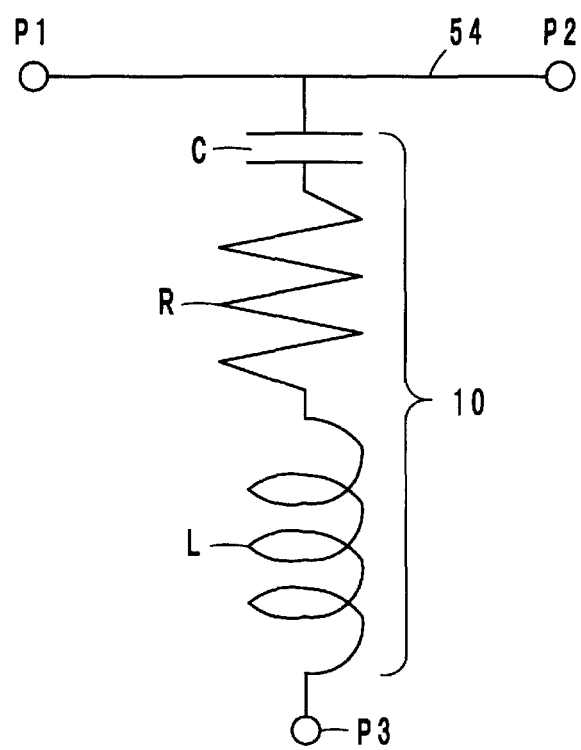
FIG. 5 is an equivalent circuit schematic of the substrate module illustrated in FIG. 4A and FIG. 4B.

A substrate module 40 including the electronic component 10 is described with reference to the drawings. FIG. 4A is a cross-sectional structure diagram of the substrate module 40, and FIG. 4B is a plane view of the substrate module 40 viewed from the positive side of a Z-axis direction. FIG. 5 is an equivalent circuit schematic of the substrate module 40 of FIG. 4A and FIG. 4B.

As illustrated in FIG. 4A, the substrate module 40 includes the electronic component 10 and a circuit substrate 51. The circuit substrate 51 includes a substrate body 52, a signal conductor 54, a ground electrode 55, a via-hole conductor 56 and a ground conductor G.

The substrate body 52 is a multilayer substrate including a plurality of ceramic layers and conductor layers stacked on each other, and includes electronic circuitry on its principle surface and therein. The signal conductor 54 is provided on the principle surface of the substrate body 52 at the positive side of the z-axis direction, and extends in the y-axis direction as illustrated in FIG. 4B. On an end of the signal conductor 54 at the positive side of the y-axis direction, an input port P1 (not shown in the figure) is provided. On an end of the signal conductor 54 at the negative side of the y-axis direction, an output port P2 (not shown in the figure) is provided. The ground electrode 55 is provided on the principle surface of the circuit substrate 51 at the positive side of the z-axis direction, and has a substantially rectangular shape as illustrated in FIG. 4B.

The ground conductor G is provided in the substrate body 52 and kept at the ground potential. The ground conductor G connects to a ground port P3, which is not shown in the figure. The via-hole conductor 56 is provided in the substrate body 52, and connects to the ground electrode 55 and the ground conductor G. According to the above, the ground electrode 55 is also kept at the ground potential.

The electronic component 10 is mounted on the circuit substrate 51. More specifically, the external electrode 12a is connected to the signal conductor 54 by a solder 60a. Similarly, the external electrode 12b is connected to the ground conductor 55 by a solder 60b. Accordingly, the substrate module 40 has a circuit structure illustrated in FIG. 5. In other words, the signal conductor 54 connects the input port P1 and the output port P2, and the electronic component 10 is provided between the signal conductor 54 and the ground port P3. In FIG. 5, a capacitor C, a resistor R and an inductor L represent the capacitance, electrical resistance and inductance that the electronic component 10 has. Having the structure illustrated in FIG. 5 in the substrate module 40, a high frequency signal is input to the input port P1 and output from the output port P2. Furthermore, of the high frequency signal input from the input port P1, components of the high frequency signal equal to resonance frequencies of the electronic component 10 are output from the ground P3 and not output from the output port P2. Note that the circuitry structure of the substrate module 40 is not limited to that illustrated in FIG. 5. Alternatively, the electronic component 10 may be provided in between the input port P1 and the output port P2 in the substrate module 40.

Figure 6:
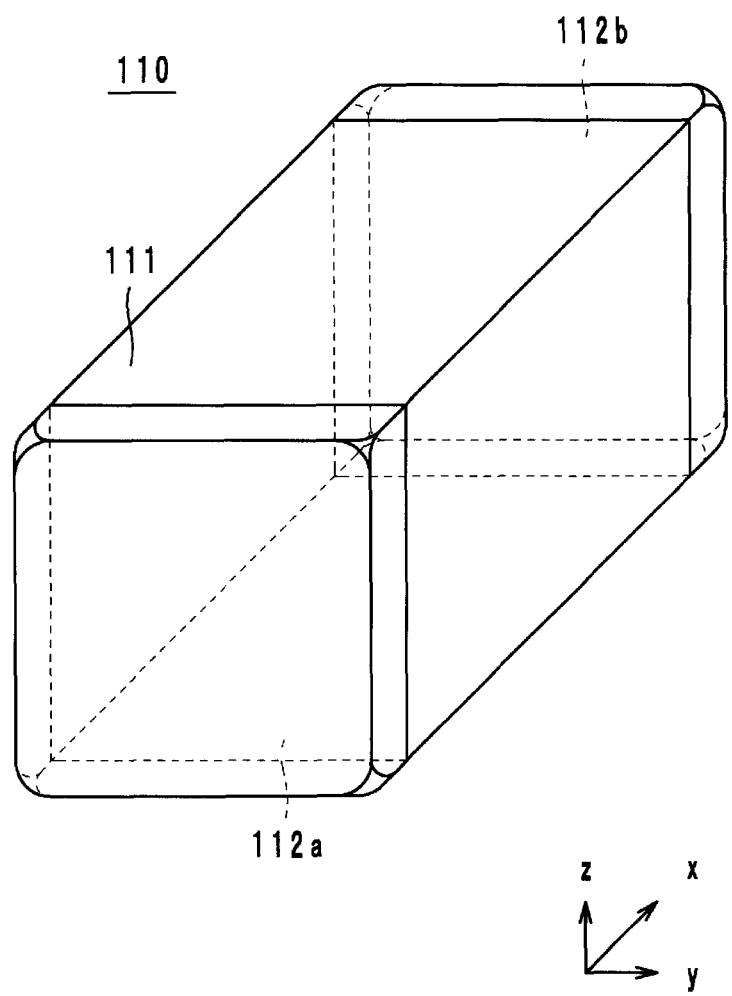
FIG. 6 is an external perspective view of an electronic component to be used as a comparative example.
Figure 7:
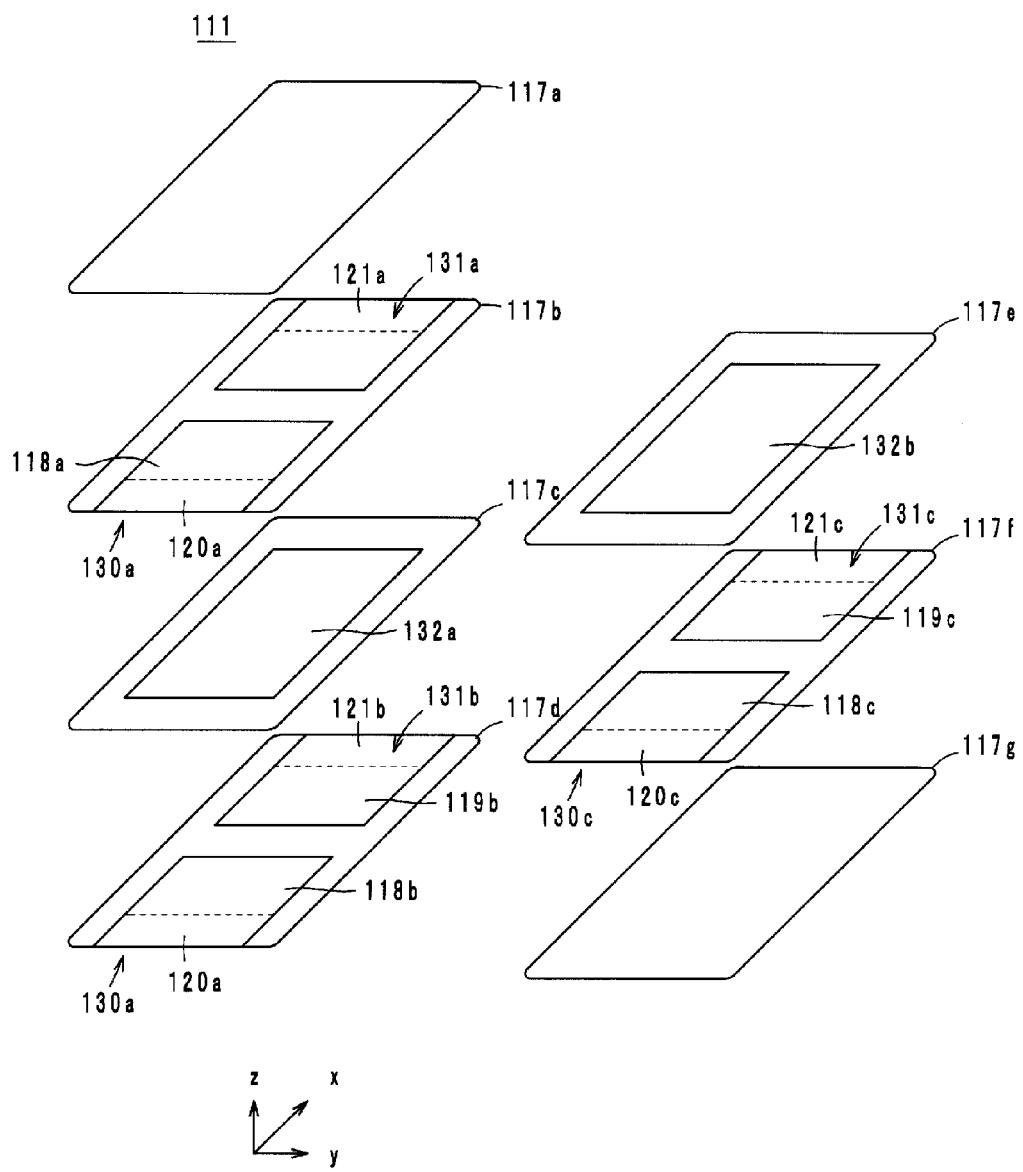
FIG. 7 is an exploded perspective view of a multilayered body of the electronic component to be used as a comparative example.

According to the electronic component 10 described above, the insertion loss in high frequency bands may be reduced as described below. FIG. 6 is an external perspective view of an electronic component 110 to be used as a comparative example. FIG. 7 is an exploded perspective view of a multilayered body 111 of the electronic component 110 to be used as a comparative example. The comparative example electronic component 110 has the same structure as the electronic component 10 except that the lead electrodes 22-25 and the external electrodes 12 on the side surfaces S5, S6 are eliminated therefrom. Thus, in the electronic component 110, portions substantially similar or identical to those of the electronic component 10 are denoted by reference numerals that are produced by adding 100 to the corresponding reference numerals of the electronic component 10.

In the comparative example electronic component 110, a high frequency signal is input into the electronic component 110 from a signal conductor via an external electrode 112a and output to a ground electrode via an external electrode 112b. In this arrangement, the high frequency signal flows in the order of the signal conductor, the external electrode 112a, a lead conductor 120, a capacitor conductor 118, an internal conductor 132, a capacitor conductor 119, a lead conductor 121, the external electrode 112b and the ground electrode. In other words, in the comparative example electronic component 110, the high frequency signal passes through only one path.

On the other hand, in the electronic component 10, the high frequency signal is input into the electronic component 10 from the signal conductor 54 via the external electrode 12a and output to the ground electrode 55 via the external electrode 12b. In this arrangement, the following first to fifth paths may be available as paths through which the high frequency signal flows.

The first path is a path such that the high frequency signal flows in the order of the signal conductor 54, the external electrode 12a, the lead conductor 20, the capacitor conductor 18, the internal conductor 32, the capacitor conductor 19, the lead conductor 21, the external electrode 12b and the ground electrode 55. The second path is a path such that the high frequency signal flows in the order of the signal conductor 54, the external electrode 12a, the lead conductor 20, the capacitor conductor 18, the lead conductors 22, 23, the external electrode 12a, the external electrode 12b and the ground electrode 55. The third path is a path such that the high frequency signal flows in the order of the signal conductor 54, the external electrode 12a, the lead conductors 22, 23, the capacitor conductor 18, the internal conductor 32, the capacitor conductor 19, the lead conductor 21, the external electrode 12b and the ground electrode 55. The fourth path is a path such that the high frequency signal flows in the order of the signal conductor 54, the external electrode 12a, the lead conductors 22, 23, the capacitor conductor 18, the internal conductor 32, the capacitor conductor 19, the lead conductors 24, 25, the external electrode 12b and the ground electrode 55. The fifth path is a path such that the high frequency signal flows in the order of the signal conductor 54, the external electrode 12a, the external electrode 12b and the ground electrode 55.

Note that, in the second to fifth paths, the high frequency signal flows from the external electrode 12a to the external electrode 12b by passing through inside the multilayered body 11 in between the external electrode 12a and the external electrode 12b. High frequency signals having frequencies higher than the first resonance point may flow through these paths.

Note that, to ensure the flow of the high frequency signals from the external electrode 12a to the external electrode 12b, it is preferable to have no external electrode, which retains a different electrical potential from those of the external electrodes 12a, 12b, in between the external electrode 12a and the external electrode 12b on the side surfaces S5, S6.

Furthermore, to ensure the flow of the high frequency signal from the external electrode 12a to the external electrode 12b, it is preferable that the gap between the external electrode 12a and the external electrode 12b may be made minimal, and more preferably about 50 μm to about 200 μm, for example.

As described in the above, in comparison with the electronic component 110, the electronic component 10 includes more paths, i.e., the second to fifth paths. That feature may contribute to the reduction of ESL. Furthermore, that feature may result the shifting of the first resonance point and the second resonance point in the electronic component 10 to higher frequency sides and the reduction of the insertion loss thereof in the high frequency bands, in comparison with the electronic component 110.

When the electronic component 10 and the electronic component 110 are compared, the shift width of the first resonance point tends to become larger in comparison with that of the second resonance point. This may be caused by having the second to fifth paths in the electronic component 10. In the electronic component 10 and the electronic component 110, the flow of high frequency signals having frequencies higher than the first resonance point may tend to concentrate in part close to the circuit substrate 51. This may provide a relatively small capacitor in a vicinity of the lower surface, and its resonance point may appeared as the second resonance point. In the electronic component 10, the large shifting of the second resonance point toward the higher frequency side may be caused by the particular reduction of ESL in a relatively small capacitor due to the high frequency signals flowing through the second to fifth paths.

Furthermore, when the electronic component 10 and the electronic component 110 are compared, a valley of the second resonance point in the electronic component 10 tends to be shallower.

The separation of the second resonance point from the first resonance point and the shallow valley at the second resonance point as described in the above may prevent a device, which operates at a frequency between the first resonance point and the second resonance point, from malfunctioning.

Furthermore, the possibility of a short-circuit may be reduced with the electronic component 10 when it is mounted on the circuit substrate 51. More specifically, the gaps D1 between the external electrode 12a and the external electrode 12b in the side surfaces S5 and S6 are smaller than the gap D2 between the external electrode 12a and the external electrode 12b in the bottom surface S2. In other words, the gap between the external electrode 12a and the external electrode 12b is made larger in the bottom surface S2. Thus, the risk of connecting the external electrode 12a and the external electrode 12b by solder is smaller. Accordingly, the possibility of a short-circuit may be reduced with the electronic component 10 when mounting on the circuit substrate 51.

With the electronic component 10, the possibility of delamination may be reduced. In electronic components, delamination is prone to occur at corners of multilayered body. Particularly, in the case where lead electrodes and ceramic layers are stacked at a corner, delamination may occur between a lead electrode and a ceramic layer. In view of the above, in the electronic component 10, the lead electrodes 20 and 21 are not led out to corners of the multilayered body 10. As a result, in the electronic component 10, the possibility of delamination is reduced. Furthermore, in the electronic component 10, the lead electrodes 20 and 21 are not exposed in the corners of the multilayered body 11. This improves moisture resistance of the electronic component 10.

The inventors of the present application carried out the following experiment to further clarify advantageous effects produced by the electronic component 10. Specifically, samples (hereinafter referred to as first sample, third sample, fifth sample and seventh sample) of the electronic component 10 illustrated in FIG. 1 and FIG. 2, and samples (second sample, fourth sample, sixth sample and eighth sample) of the electronic component 110 illustrated in FIG. 6 and FIG. 7 were prepared. Subsequently, the first to eighth samples were each mounted in a circuit substrate as illustrated in FIG. 4A and FIG. 4B, and ESL and the insertion loss (S21) between the input port P1 and the output port P2 were measured by using an network analyzer (Product No. 8722D manufactured by Agilent Technologies). First, the condition of each sample is described.

Dimension: 1.60 mm (L)×0.85 mm (W)×1.70 mm (T)

Material of the internal conductor and the external electrode: Cu

Relative permittivity ($\in$) of the ceramic layer: 27

Device thickness (gap between the internal conductors 30, 31): 122 μm

Outer layer's thickness (distance from the internal conductors 30a, 31a to the upper surface S1 of the multilayered body 11 and distance from the internal conductors 30c, 31c to the lower surface S2 of the multilayered body 11): 88 μm Table 1 indicates the condition of each sample.

TABLE 1

| | EXISTENCE OF EXTERNAL ELECTRODE 12 AND LEAD CONDUCTORS 22-25 ON SIDE SURFACES S5, S6 | GAP BETWEEN CAPACITOR CONDUCTOR 18, 19, 118, 119 AND INTERNAL CONDUCTOR 32, 132 | NUMBER OF INTERNAL CONDUCTORS 30-32, 130-132 | CAPACITANCE (pF) |
|---|---|---|---|---|
| FIRST SAMPLE | YES | 77 | 7 | 3.01 |
| SECOND SAMPLE | NO | 77 | 7 | 3.01 |
| THIRD SAMPLE | YES | 55 | 9 | 5.13 |
| FOURTH SAMPLE | NO | 55 | 9 | 5.13 |
| FIFTH SAMPLE | YES | 44 | 11 | 7.61 |
| SIXTH SAMPLE | NO | 44 | 11 | 7.61 |
| SEVENTH SAMPLE | YES | 33 | 15 | 13.8 |
| EIGHTH SAMPLE | NO | 33 | 15 | 13.8 |

With the first to eighth samples with the above conditions, the following ESL values were obtained. These ESL values were measured in the frequency band from 0.5-20 GHz. Table 2 indicates the ESL values of the first to eighth samples.

TABLE 2

|  | ESL (pH) |
|---|---|
| FIRST SAMPLE | 388 |
| SECOND SAMPLE | 489 |
| THIRD SAMPLE | 373 |
| FOURTH SAMPLE | 480 |
| FIFTH SAMPLE | 383 |
| SIXTH SAMPLE | 489 |
| SEVENTH SAMPLE | 363 |
| EIGHTH SAMPLE | 459 |

According to this experiment, it is clear that the electronic component 10 had about 20% less ESL than the electronic component 110.

Figure 8:
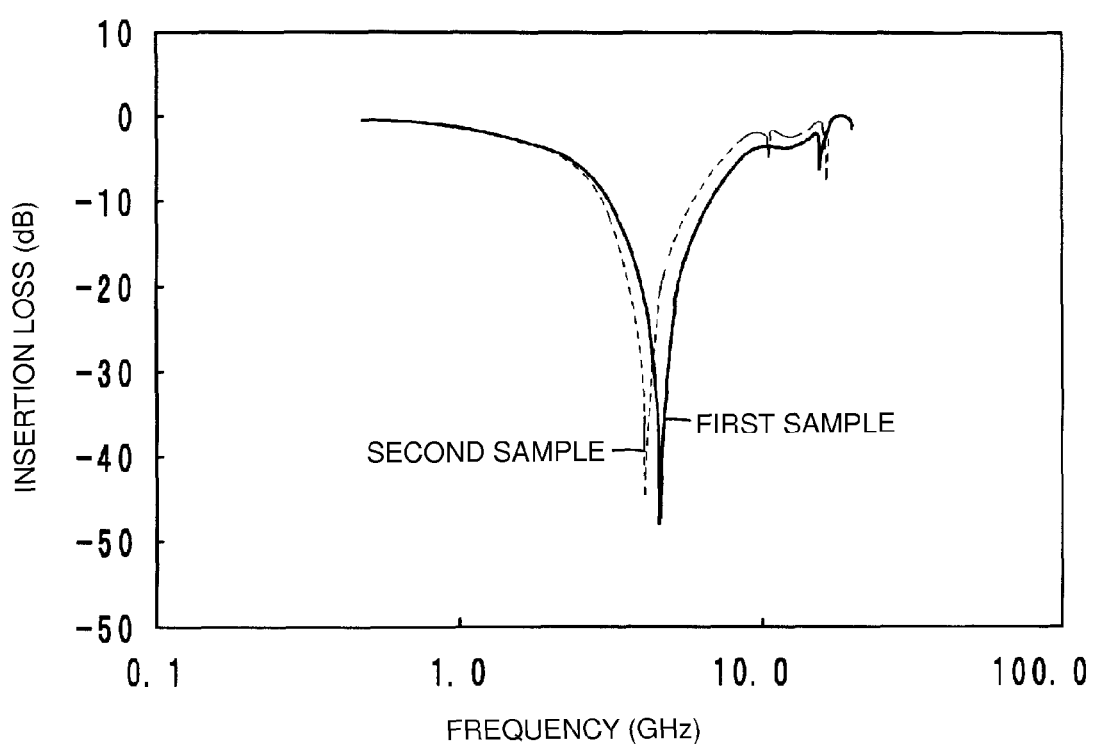
FIG. 8 is a graph representing insertion losses (S21) of a first sample and a second sample.
Figure 9:
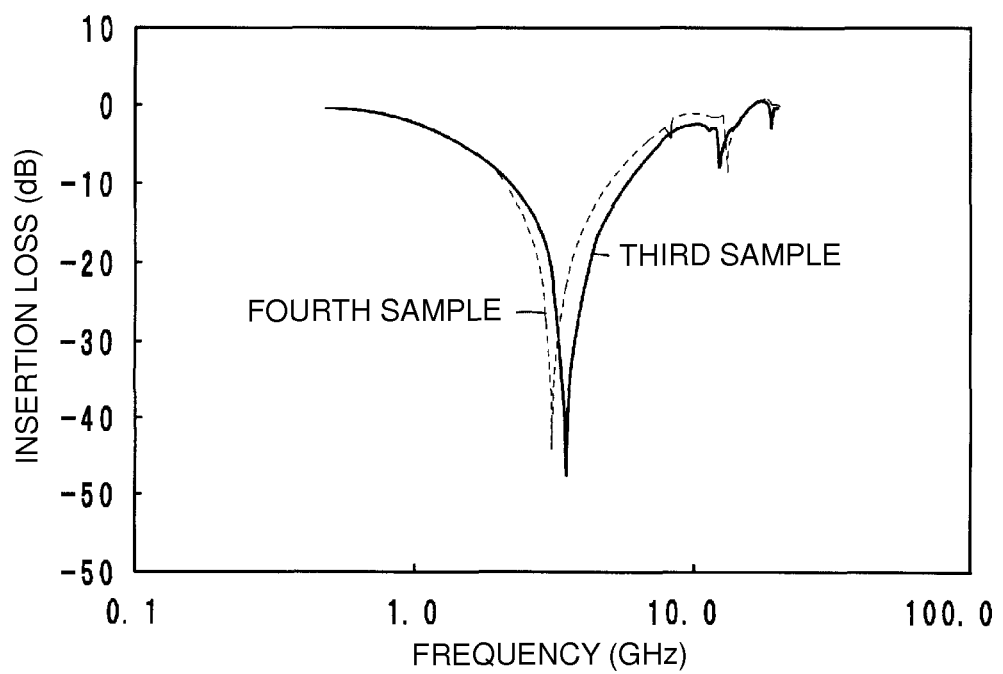
FIG. 9 is a graph representing insertion losses (S21) of a third sample and a fourth sample.
Figure 10:
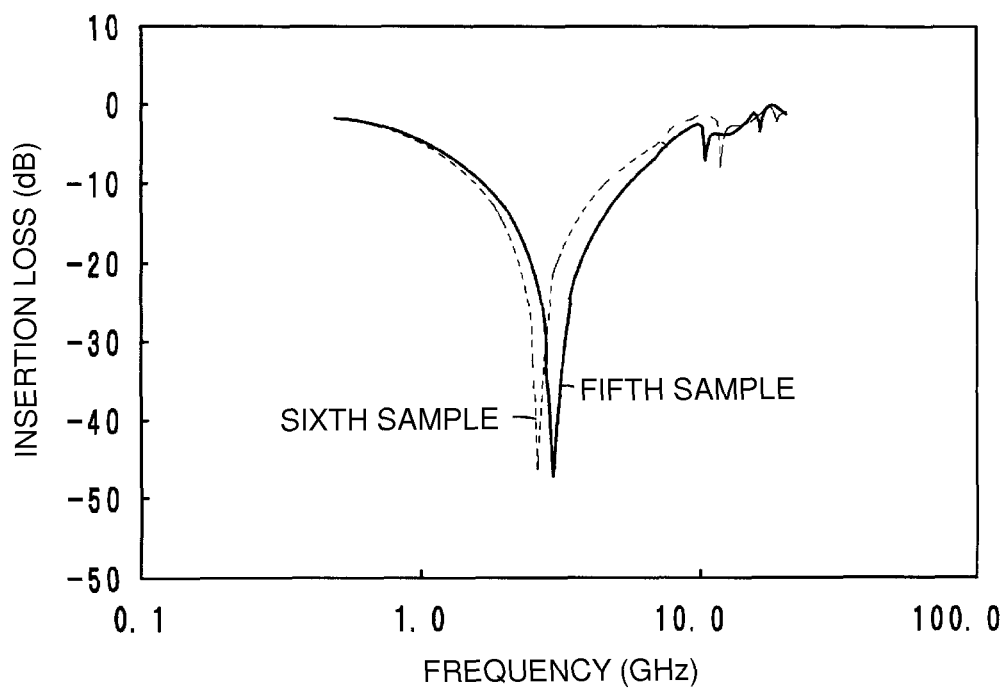
FIG. 10 is a graph representing insertion losses (S21) of a fifth sample and a sixth sample.
Figure 11:
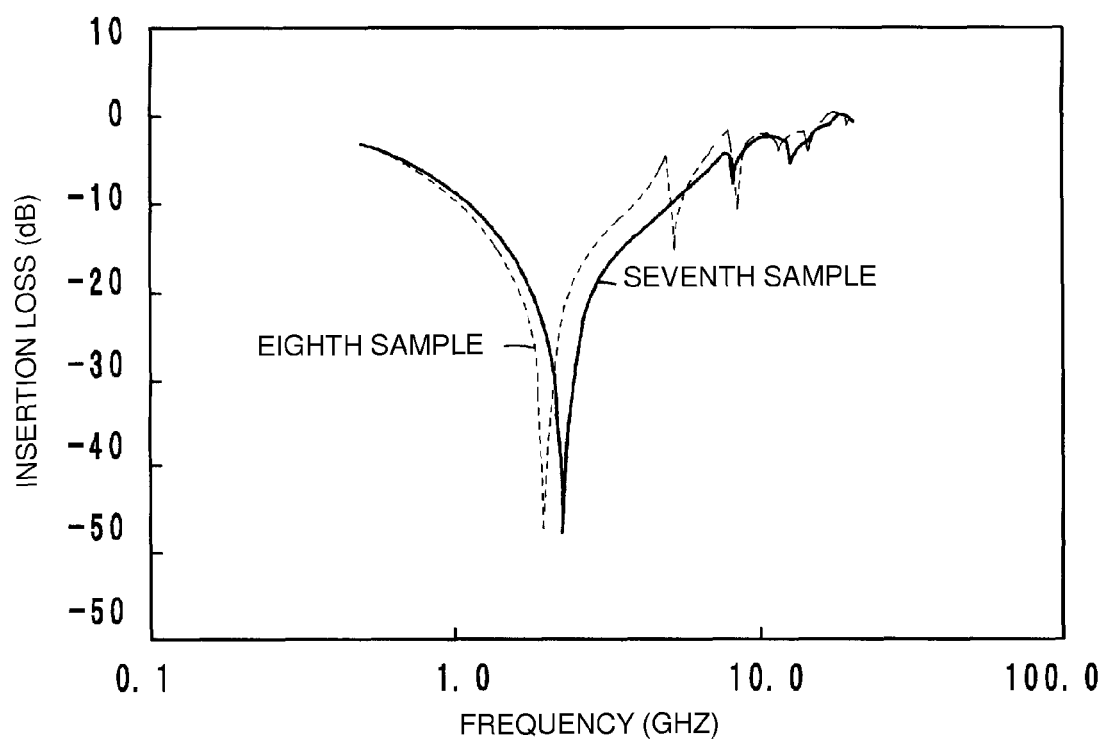
FIG. 11 is a graph representing insertion losses (S21) of a seventh sample and an eighth sample.

FIG. 8 is a graph representing the insertion loss (S21) of the first sample and the second sample. FIG. 9 is a graph representing the insertion loss (S21) of the third sample and the fourth sample. FIG. 10 is a graph representing the insertion loss (S21) of the fifth sample and the sixth sample. FIG. 11 is a graph representing the insertion loss (S21) of the seventh sample and the eighth sample. The vertical axis represents the insertion loss, and the horizontal axis represents the frequency.

According to FIG. 8 to FIG. 11, it is clear that the first resonance points f1 of the first sample, the third sample, the fifth sample and the seventh sample are higher than the corresponding first resonance points f1 of the second sample, the fourth sample, the sixth sample and the eighth sample, respectively. Table 3 indicates the first resonance points of the first to eighth samples.

TABLE 3

|  | SELF-RESONANT FREQUENCY (GHz) |
|---|---|
| FIRST SAMPLE | 4.66 |
| SECOND SAMPLE | 4.15 |
| THIRD SAMPLE | 3.64 |
| FOURTH SAMPLE | 3.21 |
| FIFTH SAMPLE | 2.95 |
| SIXTH SAMPLE | 2.61 |
| SEVENTH SAMPLE | 2.25 |
| EIGHTH SAMPLE | 2.00 |

As described in the above, according to the experiment results illustrated in FIG. 8 to FIG. 11, it is clear that the first resonance point f1 of the electronic component 10 is higher than the first resonance point f1 of the electronic component 110. Accordingly, it is clear that the high frequency characteristic of the electronic component 10 is superior to that of the electronic component 110. More specifically, the first resonance point f1 of the electronic component 10 is about 10% higher than that of the electronic component 110.

Furthermore, according to the experimental results illustrated in FIG. 8 to FIG. 11, it is clear that the second resonance point f2 of the electronic component 10 is higher than that of the electronic component 110. For example, in the graph of FIG. 11, the second resonance point f2 of the eighth sample is about 8 GHz while the second resonance point f2 of the seventh sample is about 10 GHz. Furthermore, the insertion loss of the electronic component 10 at its second resonance point f2 is less than that of electronic component 110 at its second resonance point f2. Accordingly, with the electronic component 10, the insertion loss in the high frequency bands is significantly reduced.

Second Preferred Embodiment

Figure 12:
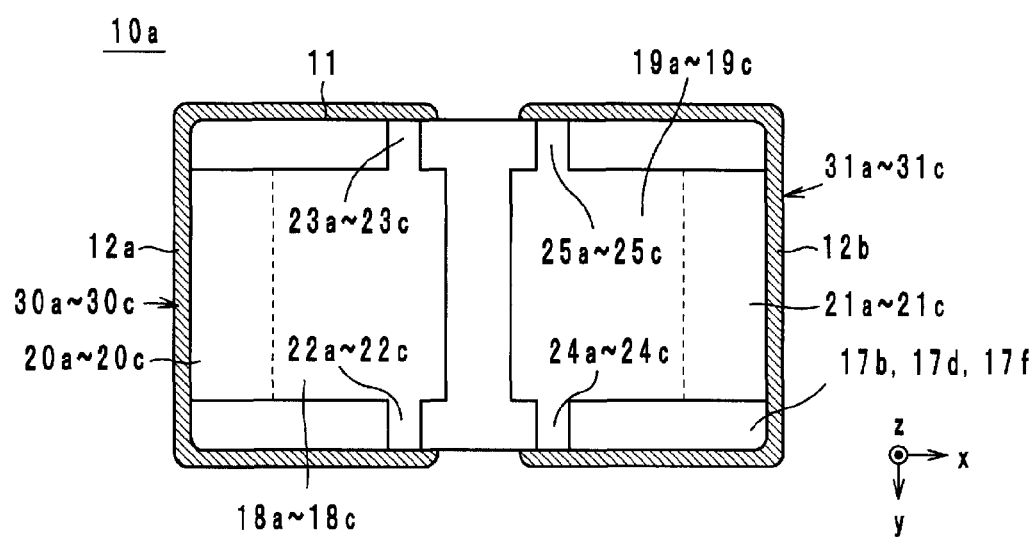
FIG. 12 is an internal plane view of an electronic component according to a second preferred embodiment of the present invention.

A structure of an electronic component 10a according to the second preferred embodiment will be described below with reference to drawings. FIG. 12 is an internal plane view of the electronic component 10a according to the second preferred embodiment. An external perspective view of the electronic component 10a is the same as that of the electronic component 10, and thus FIG. 1 is also used below.

A difference between the electronic component 10 and the electronic component 10a lies in the shape of the internal conductors 30 and 31. More specifically, the internal conductors and 31 (capacitor conductors 18 and 19) of the electronic component 10a are closer to each other than those of the electronic component 10. According to the above, in the electronic component 10a, areas of portions where the capacitor conductors 18, 19 are facing to the internal conductor 32 are larger than corresponding areas of the electronic component 10. Accordingly, the electronic component 10a has a significantly larger capacitance.

Third Preferred Embodiment

Figure 13:
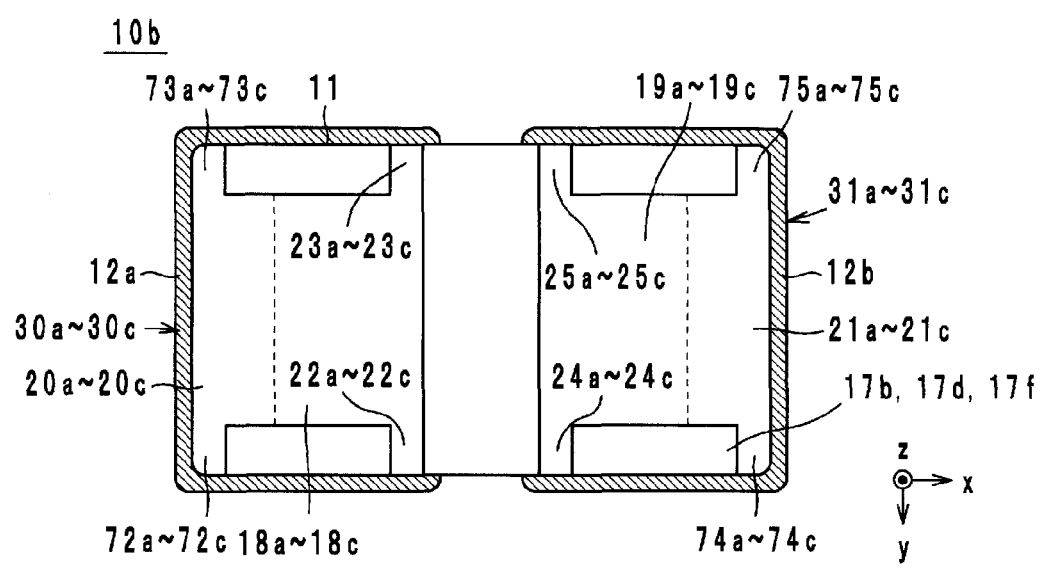
FIG. 13 is an internal plane view of an electronic component according to a third preferred embodiment of the present invention.

A structure of an electronic component 10b according to the third preferred embodiment will be described below with reference to drawings. FIG. 13 is an internal plane view of the electronic component 10b according to the third preferred embodiment. An external perspective view of the electronic component 10b is the same as that of the electronic component 10, and thus FIG. 1 is also used below.

A difference between the electronic component 10 and the electronic component 10b lies in whether or not there are lead electrodes 72 (72a-72c), 73 (73a-73c), 74 (74a-74c) and 75 (75a-75c).

The lead conductor 72 is connected to a connecting conductor 20, and led to the side surface S5 of the multilayered body 11 to be exposed at the side surface S5. The lead conductor 72 is in contact with the shorter side of the ceramic layer 17 at the negative side of the x-axis direction. Accordingly, the lead conductor 72 connects to the external electrode 12a at the longer side at the positive side of the y-axis direction and the shorter side at the negative side of the x-axis direction of the ceramic layer 17.

The lead conductor 73 is connected to a connecting conductor 20, and led to the side surface S6 of the multilayered body 11 to be exposed at the side surface S6. The lead conductor 73 is in contact with the shorter side of the ceramic layer 17 at the negative side of the x-axis direction. Accordingly, the lead conductor 73 connects to the external electrode 12a at the longer side at the negative side of the y-axis direction and the shorter side at the negative side of the x-axis direction of the ceramic layer 17.

The lead conductor 74 is connected to a connecting conductor 21, and led to the side surface S5 of the multilayered body 11 to be exposed at the side surface S5. The lead conductor 74 is in contact with the shorter side of the ceramic layer 17 at the positive side of the x-axis direction. Accordingly, the lead conductor 74 connects to the external electrode 12b at the longer side at the positive side of the y-axis direction and the shorter side at the positive side of the x-axis direction of the ceramic layer 17.

The lead conductor 75 is connected to a connecting conductor 21, and led to the side surface S6 of the multilayered body 11 to be exposed at the side surface S6. The lead conductor 75 is in contact with the shorter side of the ceramic layer 17 at the positive side of the x-axis direction. Accordingly, the lead conductor 75 is connected to the external electrode 12b at the longer side at the negative side of the y-axis direction and the shorter side at the positive side of the x-axis direction of the ceramic layer 17.

Since the electronic component 10b is provided with the lead conductors 72-75, more electric current flow paths are available in the electronic component 10b than the electronic component 10. As a result, in the electronic component 10b, the reduction of ESL is achieved more effectively.

Fourth Preferred Embodiment

Figure 14:
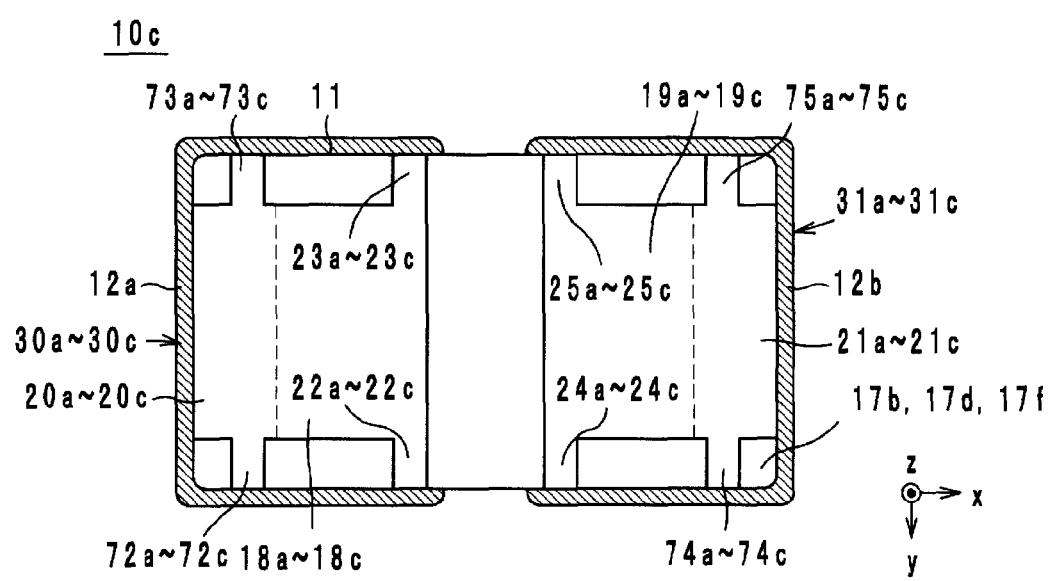
FIG. 14 is an internal plane view of an electronic component according to a fourth preferred embodiment of the present invention.

A structure of an electronic component 10c according to the fourth preferred embodiment will be described below with reference to drawings. FIG. 14 is an internal plane view of the electronic component 10c according to the fourth preferred embodiment. An external perspective view of the electronic component 10c is the same as that of the electronic component 10, and thus FIG. 1 is also used.

A difference between the electronic component 10 and the electronic component 10c lies in positions of the lead electrodes 72 (72a-72c), 73 (73a-73c), 74 (74a-74c) and 75 (75a-75c). More specifically, in the electronic component 10c, none of the lead conductors 72-75 is in contact with the shorter sides of the ceramic layer 17 at the positive and negative sides of the x-axis direction. In other words, in the corners of the ceramic layer 17, none of the lead conductors 72-75 are provided.

In the electronic component 10c, none of the lead conductors 72-75 is provided in the corner of the multilayered body 11. Accordingly, the possibility of delamination is significantly reduced.

Fifth Preferred Embodiment

Figure 15:
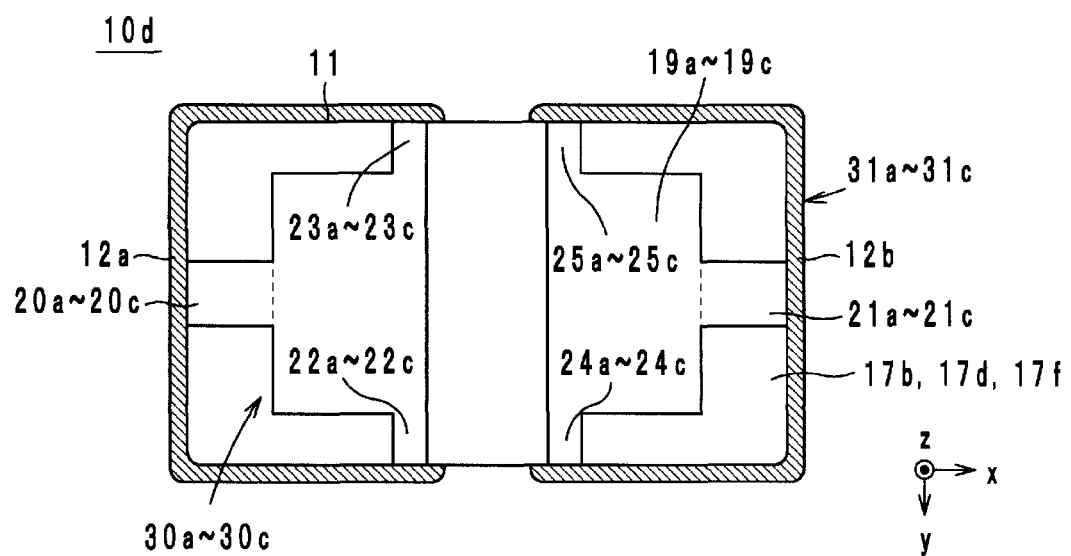
FIG. 15 is an internal plane view of an electronic component according to a fifth preferred embodiment of the present invention.

A structure of an electronic component 10d according to the fifth preferred embodiment will be described below with reference to drawings. FIG. 15 is an internal plane view of the electronic component 10d according to the fifth preferred embodiment. An external perspective view of the electronic component 10d is the same as that of the electronic component 10, and thus FIG. 1 is also used.

A difference between the electronic component 10 and the electronic component 10d lies in the shapes of the lead conductors 20 and 21. More specifically, the widths of the lead conductors 20, 21 of the electronic component 10d in the y-axis direction are narrower than those of the electronic component 10.

In the electronic component 10d, the widths of the lead conductors 20, 21 are narrower, and thus areas of portions of the internal conductors 30, 31 exposed at the multilayered body 11 are smaller. As a result, in the electronic component 10d, the entering of moisture into the multilayered body 11 is prevented.

Sixth Preferred Embodiment

Figure 16:
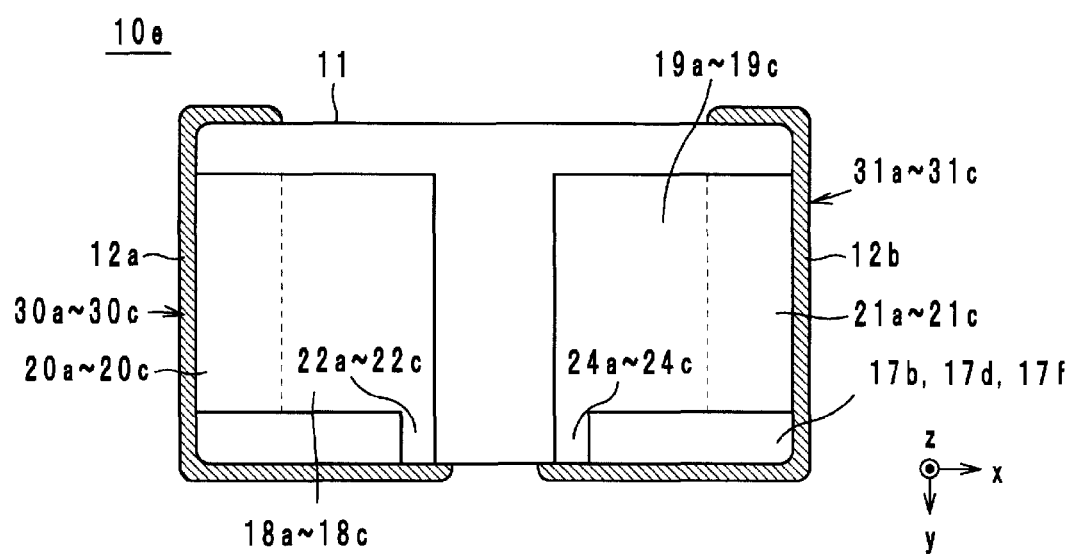
FIG. 16 is an internal plane view of an electronic component according to a sixth preferred embodiment of the present invention.

A structure of an electronic component 10e according to the sixth preferred embodiment will be described below with reference to drawings. FIG. 16 is an internal plane view of the electronic component 10e according to the sixth preferred embodiment.

As illustrated in FIG. 16, the electronic component 10e differs from the electronic component 10 in not having the lead conductors 23 and 25. In this preferred embodiment, the electronic component 10e is mounted on the circuit substrate 51 in such a way that the side surface S5 faces the circuit substrate 51.

Seventh Preferred Embodiment

Figure 17A:
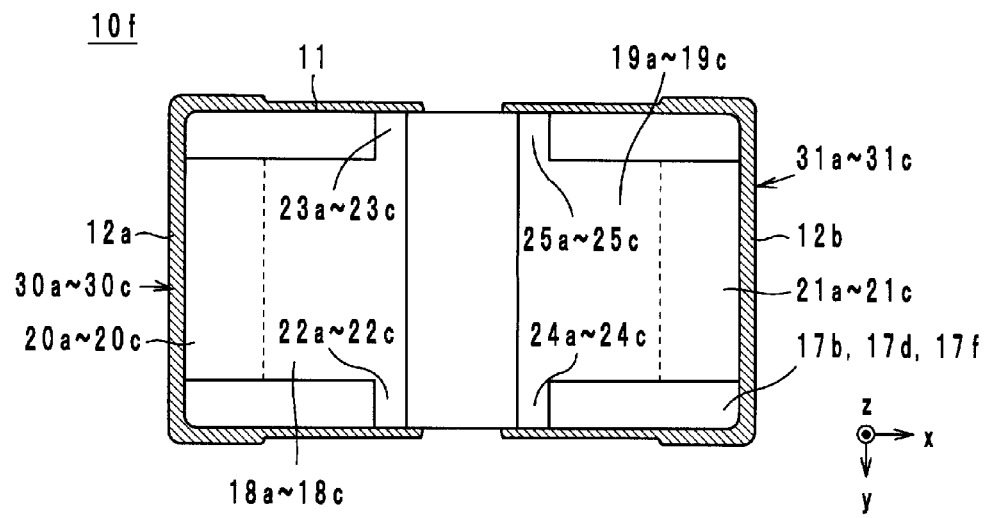
FIG. 17A and FIG. 17B are internal plane views of an electronic component according to a seventh preferred embodiment of the present invention.
Figure 17B:
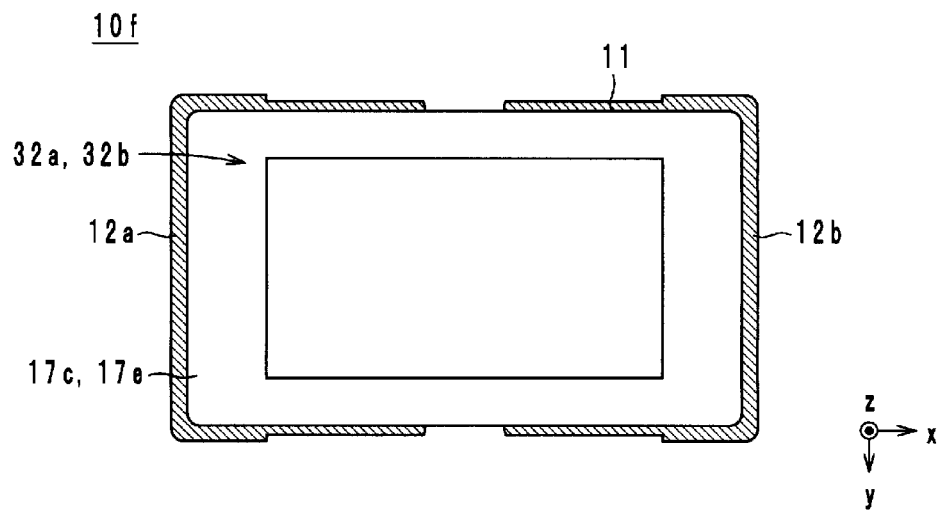

An electronic component 10f according to the seventh preferred embodiment will be described below with reference to drawings. FIG. 17A and FIG. 17B are internal plane views of the electronic component 10f according to the seventh preferred embodiment.

As illustrated in FIG. 17A and FIG. 17B, thicknesses of the external electrodes 12a and 12b in the side surfaces S5 and S6 may be made smaller than thicknesses of the external electrodes 12a and 12b in the end surfaces S3 and S4.

The external electrode 12 may be manufactured by the following steps. First, an electrically conductive paste is applied on the end surfaces S5 and S6 of the multilayered body 11 by the use of a dip method to form underlayer electrodes. Then, the electrically conductive paste is baked at a temperature of about 700° C. to about 900° C., for example. Next, plating is performed on the underlayer electrodes and the lead conductors 22-25 to complete the external electrodes 12. At this time, the external electrodes 12 on the side surfaces S5 and S6 are formed when the plating layer spreads toward surroundings of the lead electrodes 22-25.

Eighth Preferred Embodiment

Figure 18:
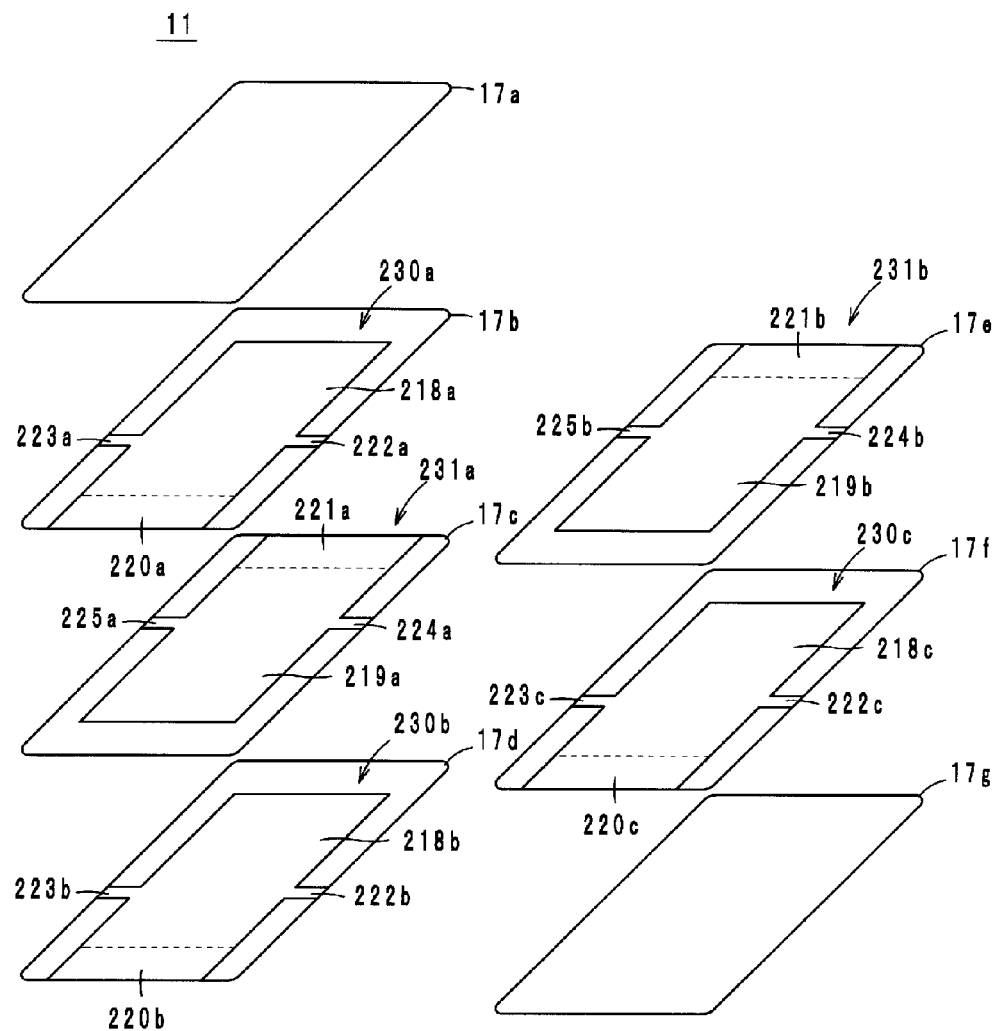
FIG. 18 is an exploded perspective view of a multilayered body of an electronic component according to an eighth preferred embodiment of the present invention.
Figure 19A:
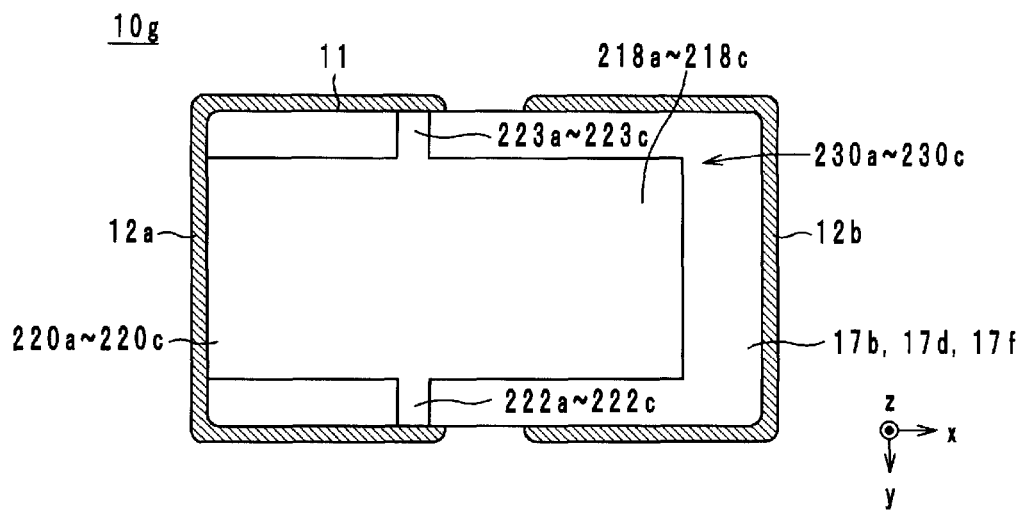
FIG. 19A and FIG. 19B are internal plane views of an electronic component of FIG. 18.
Figure 19B:
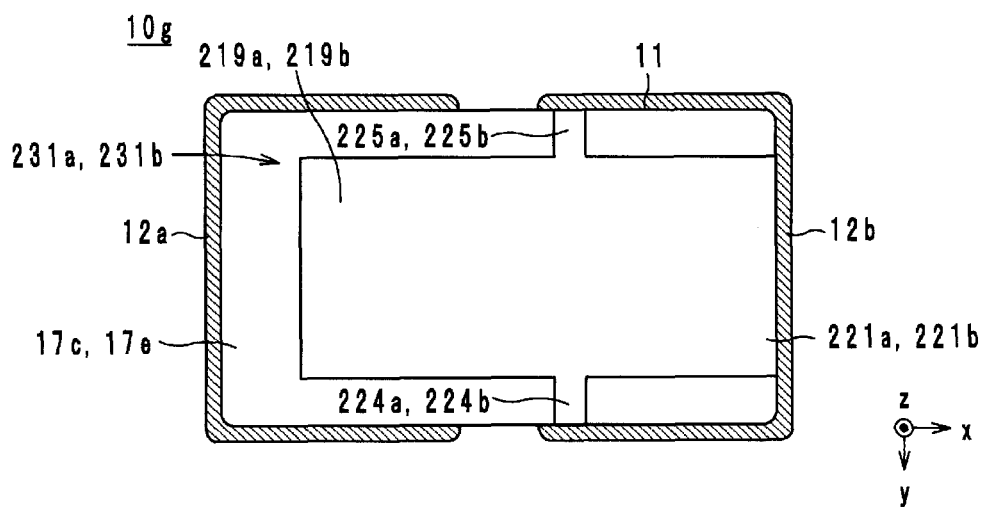

An electronic component 10g according to the eighth preferred embodiment will be described below with reference to drawings. FIG. 18 is an exploded perspective view of the multilayered body 11 of the electronic component 10g according to the eighth preferred embodiment. FIG. 19A and FIG. 19B are internal plane views of the electronic component 10g illustrated in FIG. 18. An external perspective view of the electronic component 10g is the same as that of the electronic component 10, and thus FIG. 1 is also used.

The electronic component 10g includes, for example as illustrated in FIG. 1, FIG. 18, FIG. 19A and FIG. 19B, the multilayered body 11, external electrodes 12 (12a, 12b) and internal conductors 230 (230a-230c), 231 (231a-231c) (not shown in FIG. 1).

The multilayered body 11 has a substantially rectangular solid shape except corners and ridges that are chamfered and form roundish shapes.

As illustrated in FIG. 18, the multilayered body 11 is constructed in such a way that a plurality of ceramic layers 17 (17a-17g) are stacked in order of appearance from the positive side to the negative side of the z-axis direction.

As illustrated in FIG. 18 and FIG. 19A, the plural internal conductors 230a-230c are provided on the top surfaces of different ceramic layers 17b, 17d, 17f, respectively, and embedded inside the multilayered body 11. The internal conductors 231a and 231b are provided on the top surfaces of different ceramic layers 17c and 17e, respectively, and embedded inside the multilayered body 11. In other words, the internal conductor 230 and the internal conductor 231 are stacked alternately in the z-axis direction.

The internal conductors 230 (230a-230c) have capacitor conductors 218 (218a-218c) and lead conductors 220 (220a-220c), 222 (222a-222c) and 223 (223a-223c). The capacitor conductors 218a-218c have substantially rectangular shapes, and are provided on the top surfaces of different ceramic layers 17b, 17d, 17f, respectively, in such a way that they do not touch external edges of the corresponding ceramic layers 17b, 17d, 17f.

The lead conductors 220a-220c are connected to the capacitor conductors 218a-218c, respectively, and led to the end surface S3 of the multilayered body 11 to be exposed at the end surface S3. More specifically, the lead conductor 220 protrudes toward the negative side of the x-axis direction from the shorter side of the capacitor conductor 218 at the negative side of the x-axis direction. Accordingly, the lead conductor 220 is led out to the shorter side of the ceramic layer 17 at the negative side of the x-axis direction.

The lead conductors 222a-222c are connected to the capacitor conductors 218a-218c, respectively, and led to the side surface S5 of the multilayered body 11 to be exposed at the side surface S5. More specifically, the lead conductor 222 extends toward the positive side of the y-axis direction from a position at a further negative side of the x-axis direction than a middle point of the longer side of the capacitor conductor 218 at the positive side of the y-axis direction. Accordingly, the lead conductor 222 is led out to a position at a further negative side of the x-axis direction than a middle point of the longer side of the ceramic layer 17 at the positive side of the y-axis direction.

The lead conductors 223a-223c are connected to the capacitor conductors 218a-218c, respectively, and led to the side surface S6 of the multilayered body 11 to be exposed at the side surface S6. More specifically, the lead conductor 223 extends toward the negative side of the y-axis direction from a position at a further negative side of the x-axis direction than a middle point of the longer side of the capacitor conductor 218 at the negative side of the y-axis direction. Accordingly, the lead conductor 223 is led out to a position at a further negative side of the x-axis direction than a middle point of the longer side of the ceramic layer 17 at the negative side of the y-axis direction.

The internal conductor 231 (231a, 231b) includes a capacitor conductor 219 (219a, 219b) and lead conductors 221 (221a, 221b), 224 (224a, 224b) and 225 (225a, 225b). The capacitor conductors 219a and 219b have substantially rectangular shapes, and are provided on the top surfaces of the ceramic layers 17c and 17e, respectively, in such a way that they do not touch external edges of the corresponding ceramic layers 17c and 17e. Furthermore, the capacitor conductor 219 faces the capacitor conductor 218 over the ceramic layer 17. Accordingly, capacitance (i.e., capacitor) is formed between the capacitor conductors 218 and 219.

The lead conductors 221a and 221b are connected to the capacitor conductors 219a and 219b, respectively, and led to the side surface S4 of the multilayered body 11 to be exposed at the side surface S4. More specifically, the lead conductor 221 protrudes toward the positive side of the x-axis direction from the shorter side of the capacitor conductor 219 at the positive side of the x-axis direction. Accordingly, the lead conductor 221 is led out to the shorter side of the ceramic layer 17 at the positive side of the x-axis direction.

The lead conductors 224a and 224b are connected to the capacitor conductors 219a and 219b, respectively, and led to the side surface S5 of the multilayered body 11 to be exposed at the side surface S5. More specifically, the lead conductor 224 extends toward the positive side of the y-axis direction from a position at a further positive side of the x-axis direction than a middle point of the longer side of the capacitor conductor 219 at the positive side of the y-axis direction. Accordingly, the lead conductor 224 is led out to a position at a further positive side of the x-axis direction than a middle point of the longer side of the ceramic layer 17 at the positive side of the y-axis direction. In other words, the lead conductor 224 is disposed at a further positive side of the x-axis direction than the lead conductor 222 in a plane viewed in the z-axis direction.

The lead conductors 225a and 225b are connected to the capacitor conductors 219a and 219b, respectively, and led to the side surface S6 of the multilayered body 11 to be exposed at the side surface S6. More specifically, the lead conductor 225 extends toward the negative side of the y-axis direction from a position at a further positive side of the x-axis direction than a middle point of the longer side of the capacitor conductor 219 at the negative side of the y-axis direction. Accordingly, the lead conductor 225 is led out to a position at a further negative side of the x-axis direction than a middle point of the longer side of the ceramic layer 17 at the negative side of the y-axis direction. In other words, the lead conductor 225 is disposed at a further positive side of the x-axis direction than the lead conductor 223 in a plane viewed in the z-axis direction.

The external electrode 12a is arranged so as to straddle the end surface S3, the upper surface S1, the lower surface S2 and the side surfaces S5, S6, and to connect with all the lead conductors 220a-220c, 222a-222c and 223a-223c. More specifically, the external electrode 12a covers the whole area of the end surface S3 of the multilayered body 11 so as to cover portions of the lead conductors 220a-220c exposed from the end surface S3. Furthermore, the external electrode 12a is folded down from the end surface S3 to the upper surface S1, the lower surface S2 and the side surfaces S5, S6. The external electrode 12a further covers the side surfaces S5 and S6 of the multilayered body 11 so as to cover portions of the lead conductors 222a-222c, 223a-223c exposed from the side surfaces S5 and S6.

The external electrode 12b is arranged so as to straddle the end surface S4, the upper surface S1, the lower surface S2 and the side surfaces S5, S6, and to connect with all the lead conductors 221a, 221b, 224a, 224b, 225a and 225b. More specifically, the external electrode 12b covers the whole area of the end surface S4 of the multilayered body 11 so as to cover portions of the lead conductors 221a and 221b exposed from the end surface S4. Furthermore, the external electrode 12b is folded down from the end surface S4 to the upper surface S1, the lower surface S2 and the side surfaces S5, S6. The external electrode 12b further covers the side surfaces S5 and S6 of the multilayered body 11 so as to cover portions of the lead conductors 224a, 224b, 225a and 225b exposed from the side surfaces S5 and S6.

Note that, as illustrated in FIG. 1, the widths of the external electrode 12a along the x-axis direction in the side surfaces S5 and S6 are wider than the widths of the external electrode 12a along the x-axis direction in the upper surface S1 and the lower surface S2. Similarly, the widths of the external electrode 12b along the x-axis direction in the side surfaces S5 and S6 are wider than the widths of the external electrode 12b along the x-axis direction in the upper surface S1 and the lower surface S2. According to the above, the gaps D1 between the external electrode 12a and the external electrode 12b in the side surfaces S5 and S6 are smaller than the gap D2 between the external electrode 12a and the external electrode 12b in the bottom surface S2.

Furthermore, in the side surface S5 and S6, no external electrode that retains a different electrical potential from those of the external electrodes 12a and 12b is provided in between the external electrodes 12a and 12b. In other words, there is no external electrode provided between the external electrodes 12a and 12b.

Figure 20:
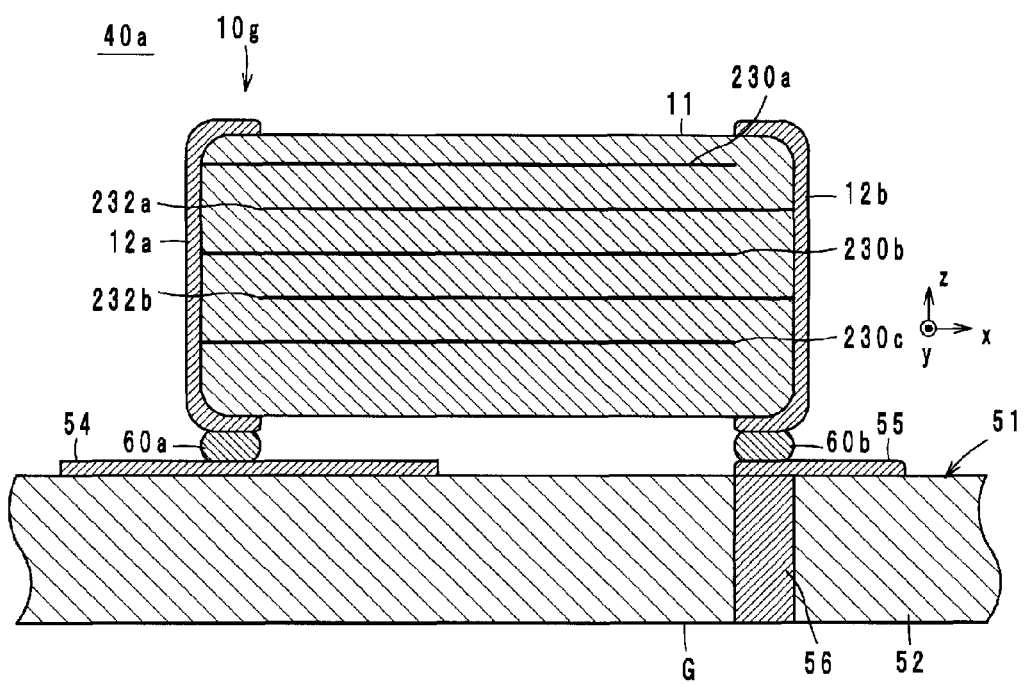
FIG. 20 is a cross-sectional structure diagram of a substrate module.

A substrate module 40a on which the electronic component 10g is mounted is described with reference to the drawings. FIG. 20 is a cross-sectional structure diagram of the substrate module 40a.

As illustrated in FIG. 20, the substrate module 40a includes the electronic component 10g and a circuit substrate 51. The circuit substrate 51 of FIG. 20 is the same as the circuit substrate 51 of FIG. 4A and FIG. 4B, and the description thereof is omitted.

The electronic component 10g is mounted on the circuit substrate 51. More specifically, the external electrode 12a is connected to the signal conductor 54 by the solder 60a. The external electrode 12b is connected to the ground conductor 55 by the solder 60b.

According to the aforementioned electronic component 10g, the insertion loss in the high frequency bands may be reduced in a similar way as in the electronic component 10. Furthermore, in a similar way as in the electronic component 10, the possibility of a short-circuit may be reduced with the electronic component 10g when mounting on the circuit substrate 51. Furthermore, the reduction of ESL may be achieved with the electronic component 10g in a similar way as in the electronic component 10. Furthermore, in the electronic component 10g, the possibility of delamination may be reduced in a similar way as in the electronic component 10. Furthermore, in the electronic component 10g, the lead electrodes 220 and 221 are not exposed at the corners of the multilayered body 11 in a similar way as in the electronic component 10. Accordingly, the moisture resistance of the electronic component 10g may be improved.

Ninth Preferred Embodiment

Figure 21A:
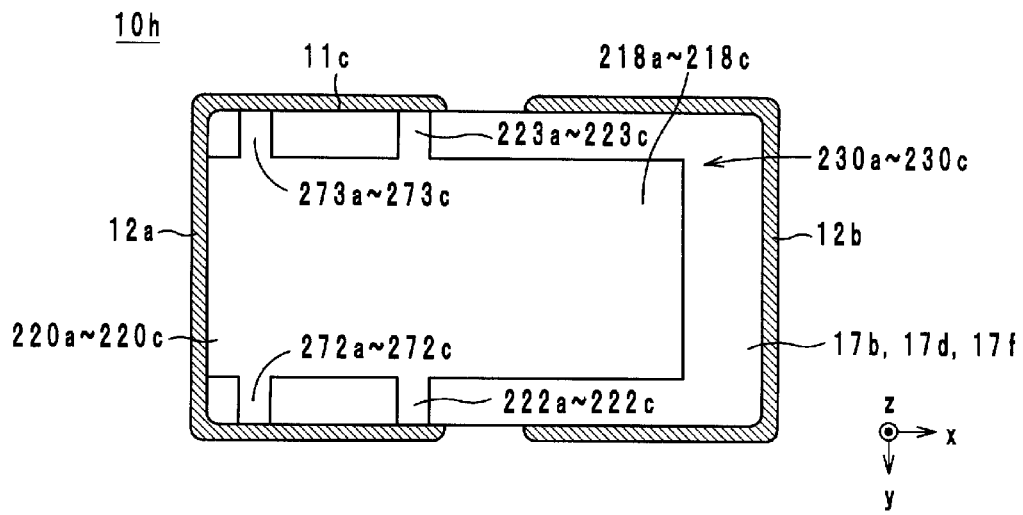
FIG. 21A and FIG. 21B are internal plane views of an electronic component according to a ninth preferred embodiment of the present invention.
Figure 21B:
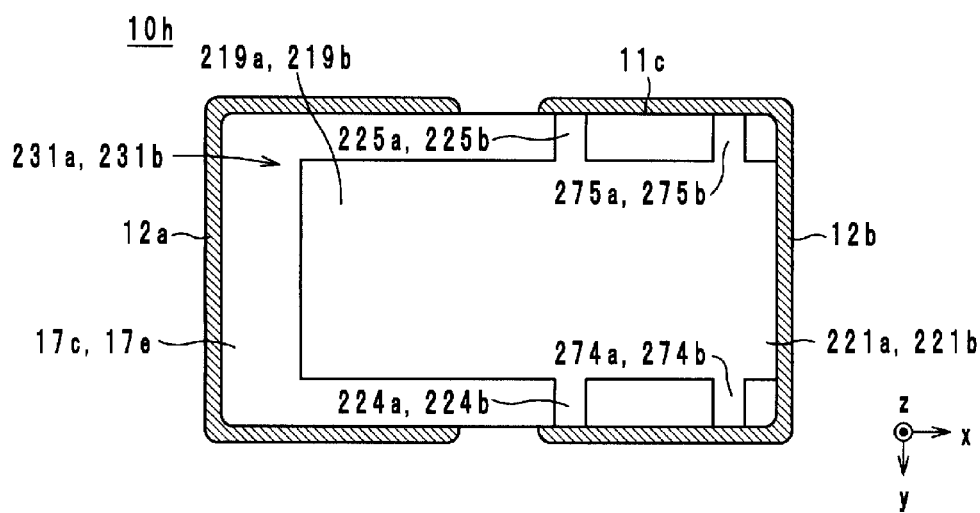

A structure of an electronic component 10h according to the ninth preferred embodiment will be described below with reference to drawings. FIG. 21A and FIG. 21B are internal plane views of the electronic component 10h according to the ninth preferred embodiment. An external perspective view of the electronic component 10h is the same as that of the electronic component 10, and thus FIG. 1 is also used.

A difference between the electronic component 10g and the electronic component 10h lies in whether or not there are lead electrodes 272 (272a-272c), 273 (273a-273c), 274 (274a-274c) and 275 (275a, 275b).

The lead conductor 272 is connected to a connecting conductor 220, and led to the side surface S5 of the multilayered body 11 to be exposed at the side surface S5. The lead conductor 272 is not in contact with the shorter side of the ceramic layer 17 at the negative side of the x-axis direction.

The lead conductor 273 is connected to a connecting conductor 220, and led to the side surface S6 of the multilayered body 11 to be exposed at the side surface S6. The lead conductor 273 is not in contact with the shorter side of the ceramic layer 17 at the negative side of the x-axis direction.

The lead conductor 274 is connected to a connecting conductor 221, and led to the side surface S5 of the multilayered body 11 to be exposed at the side surface S5. The lead conductor 274 is not in contact with the shorter side of the ceramic layer 17 at the positive side of the x-axis direction.

The lead conductor 275 is connected to a connecting conductor 221, and led to the side surface S6 of the multilayered body 11 to be exposed at the side surface S6. The lead conductor 275 is not in contact with the shorter side of the ceramic layer 17 at the positive side of the x-axis direction.

Since the electronic component 10h is provided with the lead conductors 272-275, more electric current flow paths are available in the electronic component 10h than the electronic component 10g. As a result, in the electronic component 10h, the reduction of ESL is achieved more effectively.

Tenth Preferred Embodiment

Figure 22A:
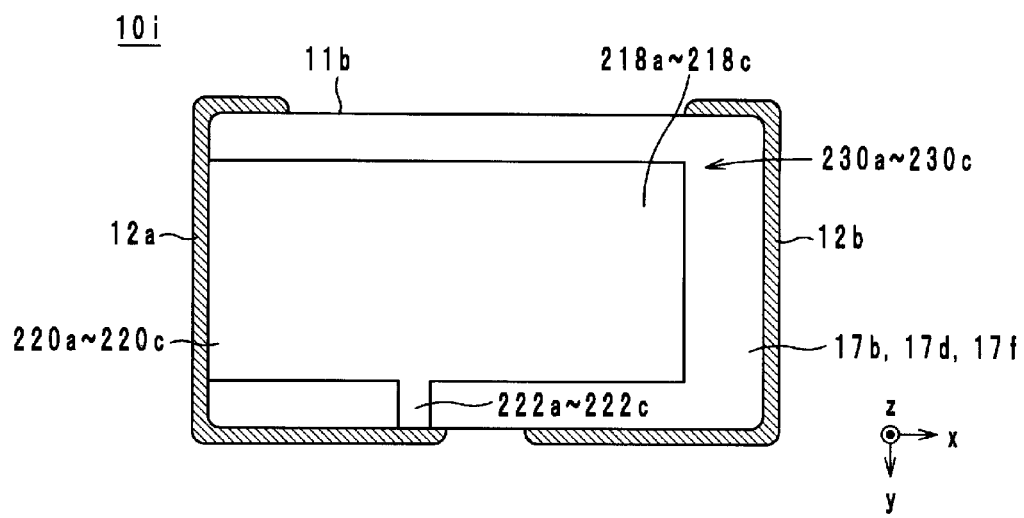
FIG. 22A and FIG. 22B are internal plane views of an electronic component according to a tenth preferred embodiment of the present invention.
Figure 22B:
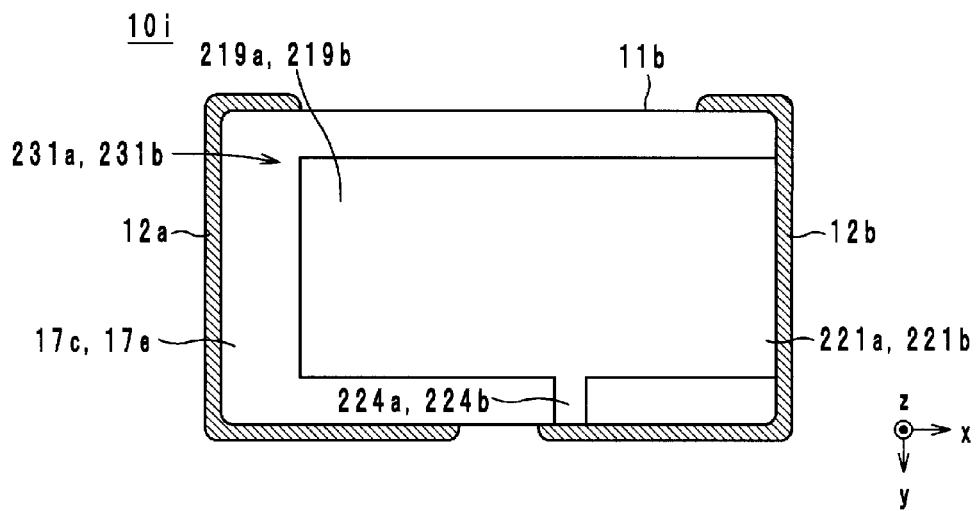

A structure of an electronic component 10i according to the tenth preferred embodiment will be described below with reference to drawings. FIG. 22A and FIG. 22B are internal plane views of the electronic component 10i according to the tenth preferred embodiment.

As illustrated in FIG. 22A and FIG. 22B, the electronic component 10i differs from the electronic component 10g in not having the lead conductors 223 and 225. In this preferred embodiment, the electronic component 10i is mounted on the circuit substrate 51 in such a way that the side surface S5 faces the circuit substrate 51.

Eleventh Preferred Embodiment

Figure 23:
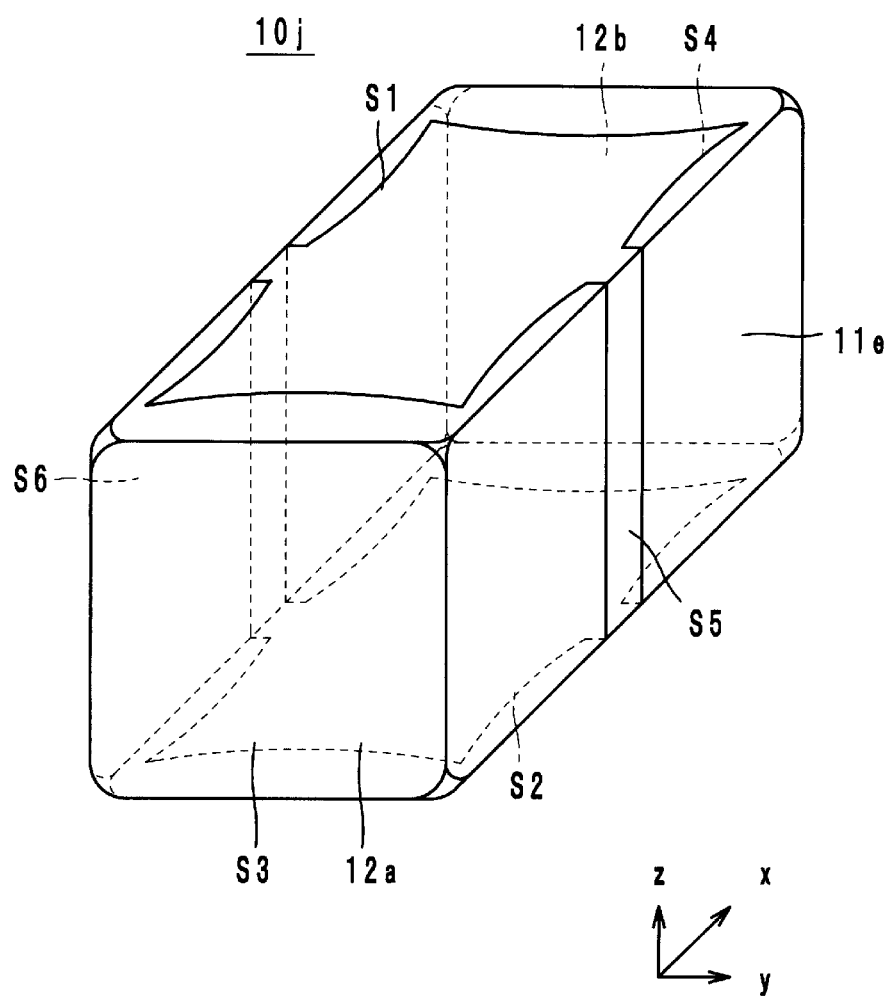
FIG. 23 is an external perspective view of an electronic component according to an eleventh preferred embodiment of the present invention.

A structure of an electronic component 10j according to the eleventh preferred embodiment will be described below with reference to drawings. FIG. 23 is an external perspective view of the electronic component 10j according to the eleventh preferred embodiment.

In the electronic component 10j, the external electrodes 12a and the external electrodes 12b each cover edges between the upper surface S1 and the side surfaces S5, S6 and edges between the lower surface S2 and the side surfaces S5, S6. In other words, the external electrodes 12a and 12b are folded down from the side surfaces S5 and S6 to the upper surface S1 and the lower surface S2.

Note, however, that it is preferable that the y-axis direction widths of the folded-down portions of the external electrodes 12a and 12b, which are folded down on the upper surface S1 and the lower surface S2, do not exceed about one-quarter of the width of the multilayered body 11 along the y-axis direction. According to the above, the possibility of a short-circuit may be reduced when the electronic component 10j is mounted on the circuit substrate 51.

With regard to the internal structure of the electronic component 10j, any one of the internal structures of the electronic components 10, 10a-10j may be adopted.

Twelfth Preferred Embodiment

Figure 24:
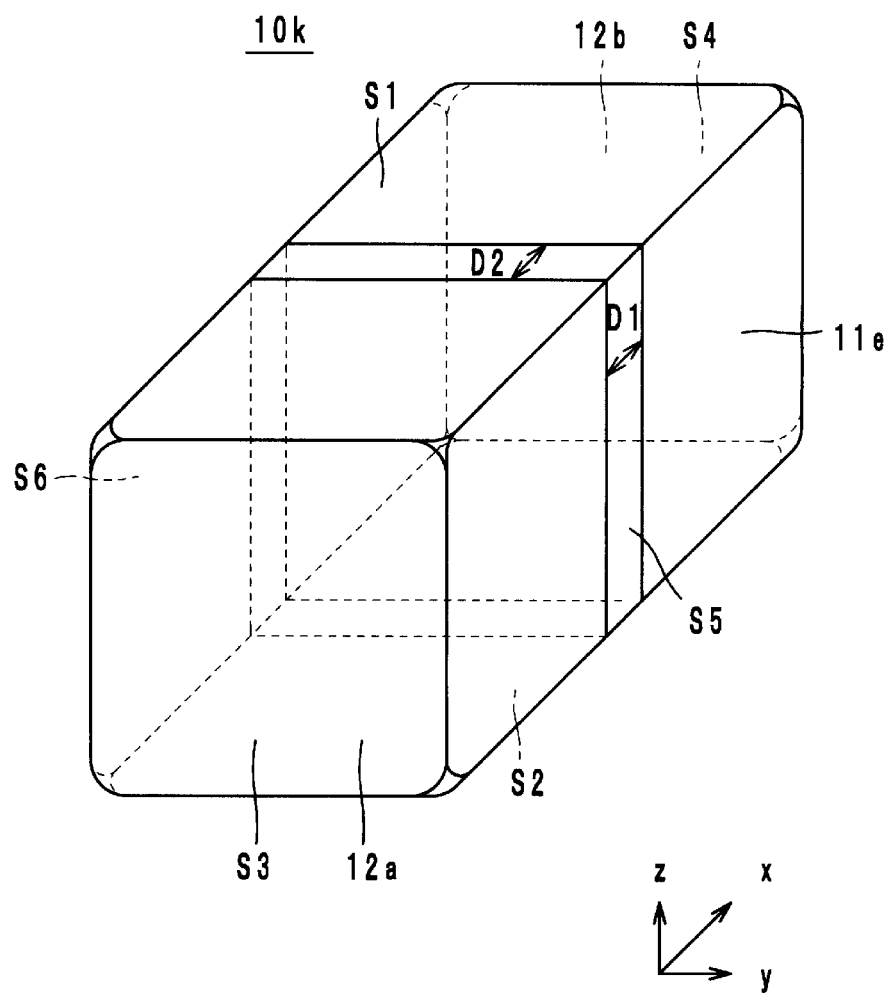
FIG. 24 is an external perspective view of an electronic component according to a twelfth preferred embodiment of the present invention.
Figure 25:
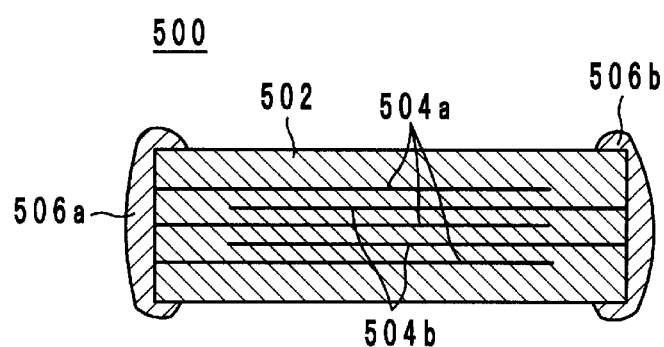
FIG. 25 is a cross-sectional structure diagram of the multilayer ceramic capacitor disclosed in Japanese Unexamined Patent Application Publication No. 2000-306762.

A structure of an electronic component 10k according to the twelfth preferred embodiment will be described below with reference to drawings. FIG. 24 is an external perspective view of the electronic component 10k according to the twelfth preferred embodiment.

As illustrated in FIG. 24, the gaps D1 between the external electrode 12a and the external electrode 12b in the side surfaces S5 and S6 may be set to equal to or approximately the same as the gap D2 between the external electrode 12a and the external electrode 12b in the bottom surface S2.

Other Preferred Embodiments

Preferred embodiments of the present invention are not limited to the electronic components 10, 10a-10k and the substrate modules 40, 40a described above, and modifications may be possible within the scope of the present invention.

For example, in place of the ceramic layer 17, a resin material such as epoxy resin, polypropylene, etc. may be used.

As mentioned in the above, preferred embodiments of the present invention are useful for electronic components and substrate modules, and particularly valuable to significantly reduce the insertion loss in the high frequency bands.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
a multilayered body having a substantially rectangular solid shape and including a plurality of dielectric layers stacked on each other;
a plurality of first capacitor conductors each being provided on a different one of the dielectric layers;
a plurality of first lead conductors each connected to the first capacitor conductor and being led out to a first end surface of the multilayered body;
a plurality of third lead conductors each connected to the first capacitor conductor and being led out to a first side surface of the multilayered body, the third lead conductor not touching the first lead conductor;
a plurality of second capacitor conductors each being provided on a different one of the dielectric layers;
a plurality of second lead conductors each connected to the second capacitor conductor and being led out to a second end surface of the multilayered body;
a plurality of fourth lead conductors each connected to the second capacitor conductor and being led out to the first side surface, the fourth lead conductor not touching the second lead conductor;
a third capacitor conductor provided on the dielectric layer, the third capacitor conductor facing the first capacitor conductor and the second capacitor conductor over the dielectric layer;
a first external electrode arranged so as to straddle the first end surface, the first side surface and a bottom surface of the multilayered body, the first external electrode connected to the plurality of first lead conductors and the plurality of third lead conductors; and
a second external electrode arranged so as to straddle the second end surface, the first side surface and the bottom surface, the second external electrode connected to the plurality of second lead conductors and the plurality of fourth lead conductors.

2. The electronic component according to claim 1, wherein a gap between the first external electrode and the second external electrode in the side surface is smaller than a gap between the first external electrode and the second external electrode in the bottom surface.

3. The electronic component according to claim 1, wherein no external electrode that retains an electrical potential is provided in between the first external electrode and the second external electrode in the first side surface, the electrical potential being different from an electrical potential of the first external electrode and an electrical potential of the second external electrode.

4. The electronic component according to claim 1, further comprising:
a plurality of fifth lead conductors each connected to the first capacitor conductor and being led out to a second side surface of the multilayered body; and
a plurality of sixth lead conductors each connected to the second capacitor conductor and being led out to the second side surface; wherein
the first external electrode is arranged so as to straddle the first end surface, the first side surface, the second side surface and the bottom surface, and is connected to the plurality of fifth lead conductors; and
the second external electrode is arranged so as to straddle the second end surface, the first side surface, the second side surface and the bottom surface, and is connected to the plurality of sixth lead conductors.

5. A substrate module comprising:
a circuit substrate including a first land and a second land; and
the electronic component according to claim 1, the electronic component being mounted on the circuit substrate; wherein
the first external electrode is connected to the first land; and
the second external electrode is connected to the second land.

6. An electronic component comprising:
a multilayered body having a substantially rectangular solid shape and including a plurality of dielectric layers stacked on each other;
a plurality of first capacitor conductors each being provided on a different one of the dielectric layers;
a plurality of first lead conductors each connected to the first capacitor conductor and being led out to a first end surface of the multilayered body;
a plurality of third lead conductors each connected to the first capacitor conductor and being led out to a first side surface of the multilayered body, the third lead conductor not touching the first lead conductor;
a plurality of second capacitor conductors each being provided on a different one of the dielectric layers and facing one of the first capacitor conductors over the dielectric layer;
a plurality of second lead conductors each connected to the second capacitor conductor and being led out to a second end surface of the multilayered body;
a plurality of fourth lead conductors each connected to the second capacitor conductor and being led out to the first side surface, the fourth lead conductor not touching the second lead conductor;
a first external electrode arranged so as to straddle the first end surface, the first side surface and a bottom surface of the multilayered body, the first external electrode connected to the plurality of first lead conductors and the plurality of third lead conductors; and
a second external electrode arranged so as to straddle the second end surface, the first side surface and the bottom surface, the second external electrode connected to the plurality of second lead conductors and the plurality of fourth lead conductors.

7. The electronic component according to claim 6, wherein a gap between the first external electrode and the second external electrode in the side surface is smaller than a gap between the first external electrode and the second external electrode in the bottom surface.

8. The electronic component according to claim 6, wherein no external electrode that retains an electrical potential is provided in between the first external electrode and the second external electrode in the first side surface, the electrical potential being different from an electrical potential of the first external electrode and an electrical potential of the second external electrode.

9. The electronic component according to claim 6, further comprising:

a plurality of fifth lead conductors each connected to the first capacitor conductor and being led out to a second side surface of the multilayered body; and a plurality of sixth lead conductors each connected to the second capacitor conductor and being led out to the second side surface; wherein the first external electrode is arranged so as to straddle the first end surface, the first side surface, the second side surface and the bottom surface, and is connected to the plurality of fifth lead conductors; and the second external electrode is arranged so as to straddle the second end surface, the first side surface, the second side surface and the bottom surface, and is connected to the plurality of sixth lead conductors.

10. A substrate module comprising:

a circuit substrate including a first land and a second land; and the electronic component according to claim 6, the electronic component being mounted on the circuit substrate; wherein the first external electrode is connected to the first land; and the second external electrode is connected to the second land.

* * * * *